(12) United States Patent
Kim et al.

(10) Patent No.: US 12,130,073 B2
(45) Date of Patent: Oct. 29, 2024

(54) VACUUM ADIABATIC MODULE AND REFRIGERATOR

(71) Applicant: LG ELECTRONICS INC., Seoul (KR)

(72) Inventors: Daewoong Kim, Seoul (KR); Deokhyun Youn, Seoul (KR); Wonyeong Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 17/620,020

(22) PCT Filed: Jul. 8, 2020

(86) PCT No.: PCT/KR2020/008967
§ 371 (c)(1),
(2) Date: Dec. 16, 2021

(87) PCT Pub. No.: WO2021/006640
PCT Pub. Date: Jan. 14, 2021

(65) Prior Publication Data
US 2022/0235997 A1  Jul. 28, 2022

(30) Foreign Application Priority Data
Jul. 9, 2019 (KR) .................. 10-2019-0082683

(51) Int. Cl.
*F25D 23/06* (2006.01)
*F16L 59/065* (2006.01)
(Continued)

(52) U.S. Cl.
CPC .......... *F25D 23/065* (2013.01); *F16L 59/065* (2013.01); *F16L 59/12* (2013.01);
(Continued)

(58) Field of Classification Search
CPC .... F25D 23/065; F25D 23/028; F25D 23/062; F25D 2201/14; F25D 2323/021;
(Continued)

(56) References Cited

U.S. PATENT DOCUMENTS 1,814,114 A * 7/1931 Bodman ................. F25D 3/102
62/46.3
1,898,977 A * 3/1933 Comstock ............. F25D 23/062
220/592.27
(Continued)

FOREIGN PATENT DOCUMENTS

CA      2964447 C  * 5/2023  ............ F16L 59/065
CN    104634047 A     5/2015
(Continued)

OTHER PUBLICATIONS

International Search Report and Written Opinion dated Sep. 29, 2020 issued in PCT Application No. PCT/KR2020/008967.
(Continued)

*Primary Examiner* — Hanh V Tran
(74) *Attorney, Agent, or Firm* — KED & ASSOCIATES, LLP

(57) ABSTRACT

Provided is a vacuum adiabatic module. The vacuum adiabatic module include an inner cover corresponding to an inner space, an outer cover corresponding to an outer space, the outer cover being provided to be larger than the inner cover, a vacuum space which is defined as inner spaces of the outer cover and the inner cover and is in a vacuum state, and a conductive resistance sheet provided on a connection portion between the inner cover and the outer cover to resist to thermal conduction. According to this embodiment, the vacuum adiabatic module may be more conveniently applied to the refrigerator and easily handled to easily fabricate the refrigerator.

19 Claims, 16 Drawing Sheets

(51) Int. Cl.
    *F16L 59/12*     (2006.01)
    *F25D 23/02*     (2006.01)

(52) U.S. Cl.
    CPC ......... *F25D 23/028* (2013.01); *F25D 23/062* (2013.01); *F25D 2201/14* (2013.01); *F25D 2323/021* (2013.01); *F25D 2323/022* (2013.01); *F25D 2400/40* (2013.01)

(58) Field of Classification Search
    CPC .......... F25D 2323/022; F25D 2400/40; F25D 23/063; F25D 11/02; F25D 23/006; F25D 23/021; F16L 59/065; F16L 59/12
    See application file for complete search history.

(56) References Cited

U.S. PATENT DOCUMENTS

| | | | | |
|---|---|---|---|---|
| 2,000,882 | A * | 5/1935 | Comstock | F25D 23/062 220/592.27 |
| 2,065,608 | A * | 12/1936 | Munters | F25D 23/062 62/DIG. 13 |
| 2,464,526 | A * | 3/1949 | Palmer | F25D 23/082 220/592.08 |
| 2,808,624 | A * | 10/1957 | Sullivan | E04B 1/6125 52/584.1 |
| 2,855,636 | A * | 10/1958 | Donnelly | F25D 23/085 52/794.1 |
| 2,989,156 | A * | 6/1961 | Brooks | F25D 23/06 220/592.27 |
| 3,256,663 | A * | 6/1966 | Bishop | E04B 1/76 52/395 |
| 3,632,011 | A * | 1/1972 | Kitson | F25D 23/064 220/592.06 |
| 4,150,518 | A * | 4/1979 | Truesdell | F25D 23/02 220/592.08 |
| 4,732,432 | A * | 3/1988 | Keil | F25D 23/082 220/592.06 |
| 6,269,608 | B1 * | 8/2001 | Porter | E04B 1/14 52/459 |
| 8,752,921 | B2 * | 6/2014 | Gorz | F25D 23/062 312/401 |
| 9,702,615 | B1 * | 7/2017 | Chartrand | F25D 23/02 |
| 10,174,989 | B2 | 1/2019 | Jung et al. | |
| 10,883,758 | B2 | 1/2021 | Jung et al. | |
| 11,181,315 | B2 * | 11/2021 | Costanza | E04C 2/528 |
| 11,248,833 | B2 * | 2/2022 | Kim | F25D 23/06 |
| 11,493,261 | B2 * | 11/2022 | Nam | F25D 23/082 |
| 11,692,764 | B2 * | 7/2023 | Kang | B32B 15/20 62/268 |
| 11,725,768 | B2 * | 8/2023 | Nam | F16L 59/02 312/406 |
| 11,761,699 | B2 * | 9/2023 | Jung | F25D 23/087 312/406 |
| 2002/0041134 | A1 * | 4/2002 | Wolf | F25D 23/062 312/400 |
| 2002/0100250 | A1 * | 8/2002 | Hirath | F25D 23/062 52/800.12 |
| 2004/0226956 | A1 | 11/2004 | Brooks | |
| 2005/0204697 | A1 * | 9/2005 | Rue | E04B 5/02 52/782.1 |
| 2007/0152551 | A1 * | 7/2007 | Kim | F25D 23/063 312/401 |
| 2011/0126571 | A1 * | 6/2011 | Selin | F25D 19/00 62/449 |
| 2012/0104923 | A1 * | 5/2012 | Jung | F25D 23/066 312/406 |
| 2013/0257256 | A1 * | 10/2013 | Allard | F25D 23/065 29/525.01 |
| 2015/0030800 | A1 | 1/2015 | Jung et al. | |
| 2016/0109172 | A1 * | 4/2016 | Kim | F25D 23/065 312/406.1 |
| 2016/0258671 | A1 * | 9/2016 | Allard | F25D 23/085 |
| 2017/0023291 | A1 * | 1/2017 | Kal | B32B 1/00 |
| 2017/0292776 | A1 * | 10/2017 | Kim | F25D 23/062 |
| 2017/0370632 | A1 * | 12/2017 | Jeong | F25D 23/062 |
| 2018/0017314 | A1 * | 1/2018 | Jeong | F25D 23/061 |
| 2018/0238610 | A1 * | 8/2018 | Jung | F25D 23/028 |
| 2018/0259243 | A1 | 9/2018 | Lv et al. | |
| 2019/0078829 | A1 * | 3/2019 | Okazaki | F25D 23/066 |
| 2019/0128593 | A1 | 5/2019 | Deka et al. | |
| 2021/0333043 | A1 * | 10/2021 | Kim | F16L 59/065 |

FOREIGN PATENT DOCUMENTS

| | | | | |
|---|---|---|---|---|
| CN | 105627657 | A * | 6/2016 | ............. F25D 11/00 |
| CN | 107850381 | A | 3/2018 | |
| CN | 107923702 | | 4/2018 | |
| EP | 2 719 981 | | 4/2014 | |
| EP | 3410049 | | 12/2018 | |
| JP | S637828 | Y2 * | 3/1988 | |
| JP | H0293689 | U * | 7/1990 | |
| JP | 2005-156080 | | 6/2005 | |
| JP | J 2012-207682 | A | 10/2012 | |
| JP | 2013-002654 | | 1/2013 | |
| JP | 2015-227774 | | 12/2015 | |
| KR | 860000526 | A * | 1/1986 | |
| KR | 10-0343719 | | 7/2002 | |
| KR | 20050102546 | A * | 10/2005 | |
| KR | 100903146 | B1 * | 6/2009 | |
| KR | 10-2015-0012712 | | 2/2015 | |
| KR | 10-2017-0016187 | | 2/2017 | |
| KR | 10-2017-0050110 | | 5/2017 | |
| KR | 10-2019-0070753 | | 6/2019 | |
| WO | WO-2012176880 | A1 * | 12/2012 | ........... F25D 23/065 |
| WO | WO-2017023075 | A1 * | 2/2017 | ........... F16L 59/065 |
| WO | WO-2017023088 | A1 * | 2/2017 | ........... F25D 19/006 |
| WO | WO-2017023089 | A1 * | 2/2017 | ........... E06B 3/66304 |
| WO | WO-2017023102 | A1 * | 2/2017 | ........... F16L 59/065 |
| WO | WO 2017/180147 | A1 | 10/2017 | |
| WO | WO-2018143691 | A1 * | 8/2018 | ........... F16L 59/065 |
| WO | WO 2019/117596 | A1 | 6/2019 | |
| WO | WO-2019117598 | A1 * | 6/2019 | ............. F16L 59/02 |

OTHER PUBLICATIONS

Chinese Office Action dated Apr. 21, 2023 issued in Application 202080050102.8.
Extended European Search Report dated Jun. 12, 2023 issued in Application 20836672.4.
Chinese Notice of Allowance dated Apr. 9, 2024, issued in Application No. 202080050102.8.

* cited by examiner

[Fig. 1]
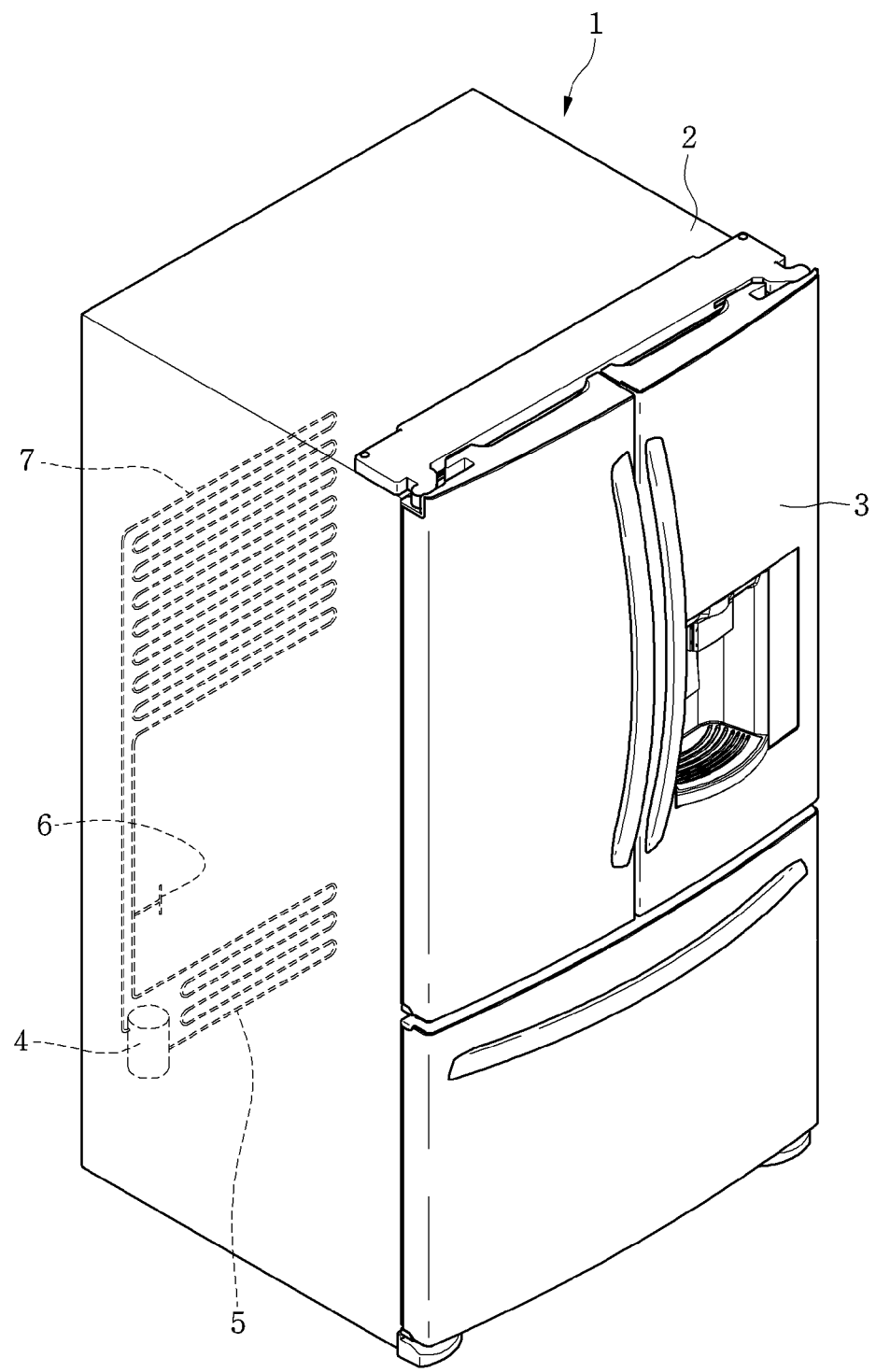

[Fig. 2]
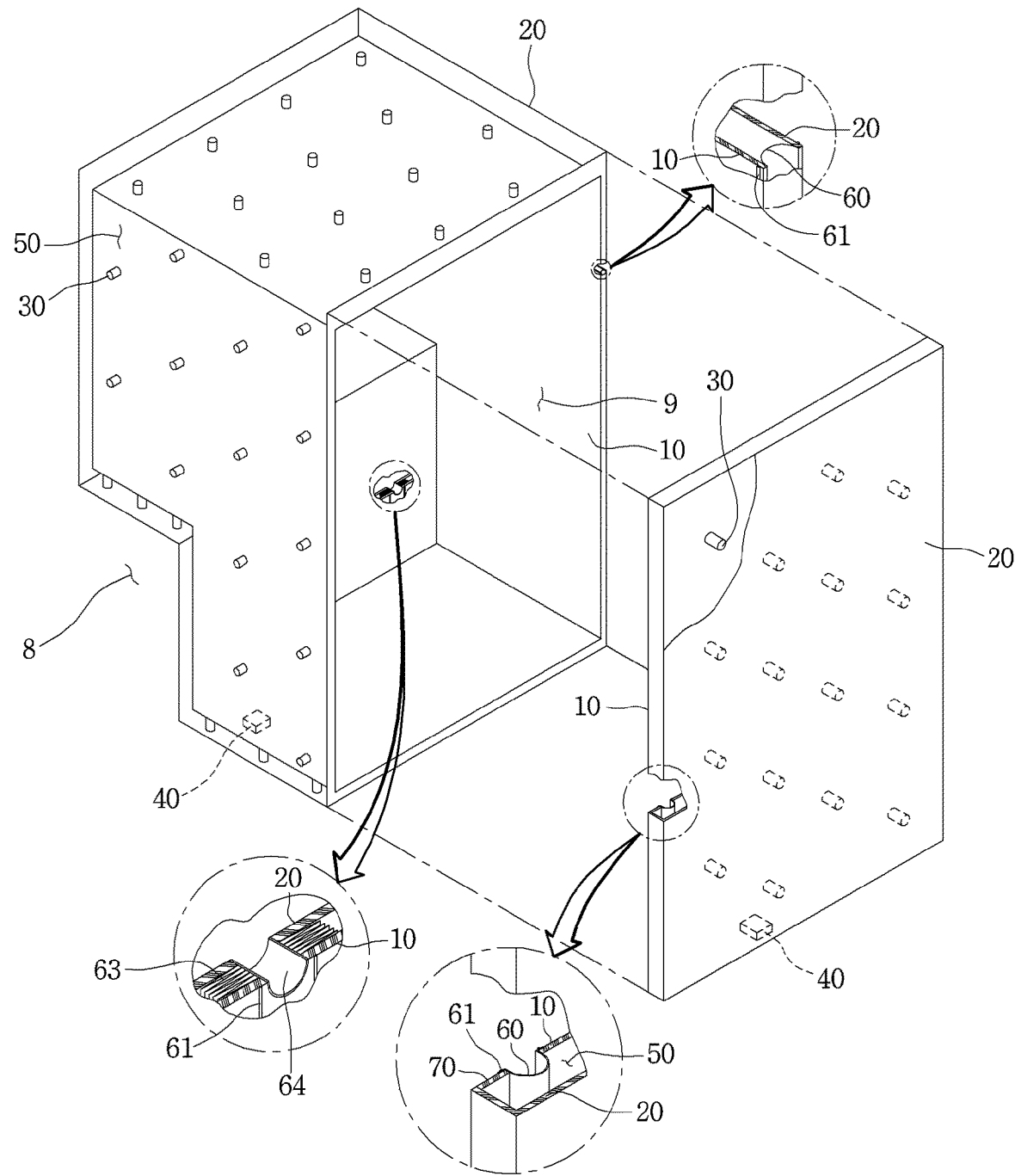

[Fig. 3]
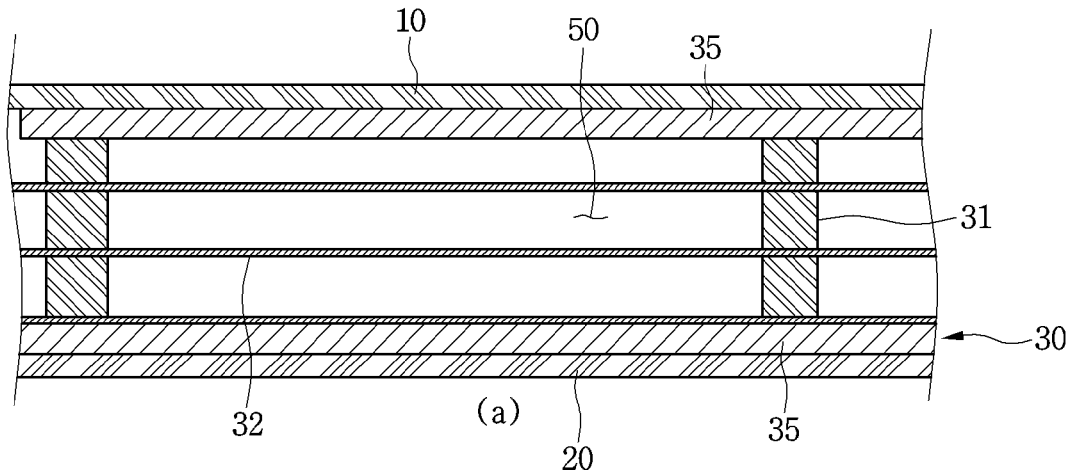
(a)
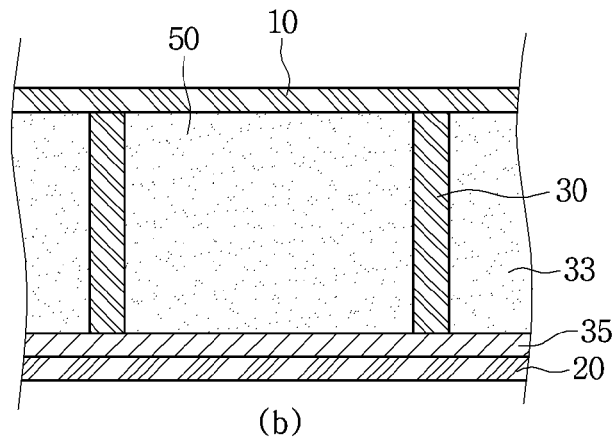
(b)
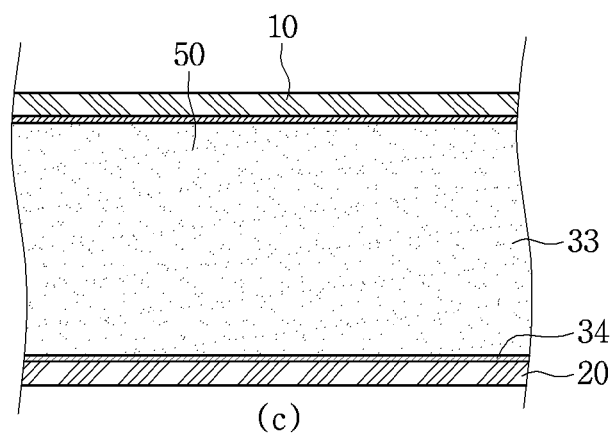
(c)

[Fig. 4]
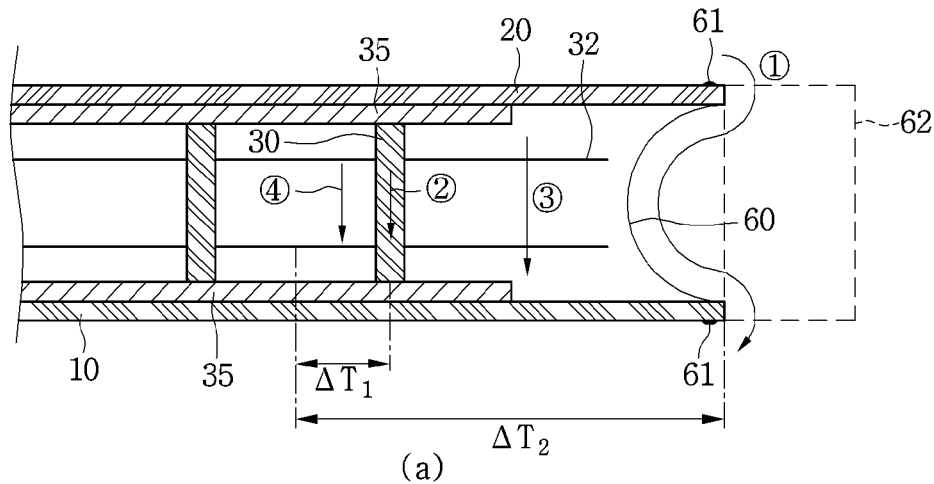
(a)
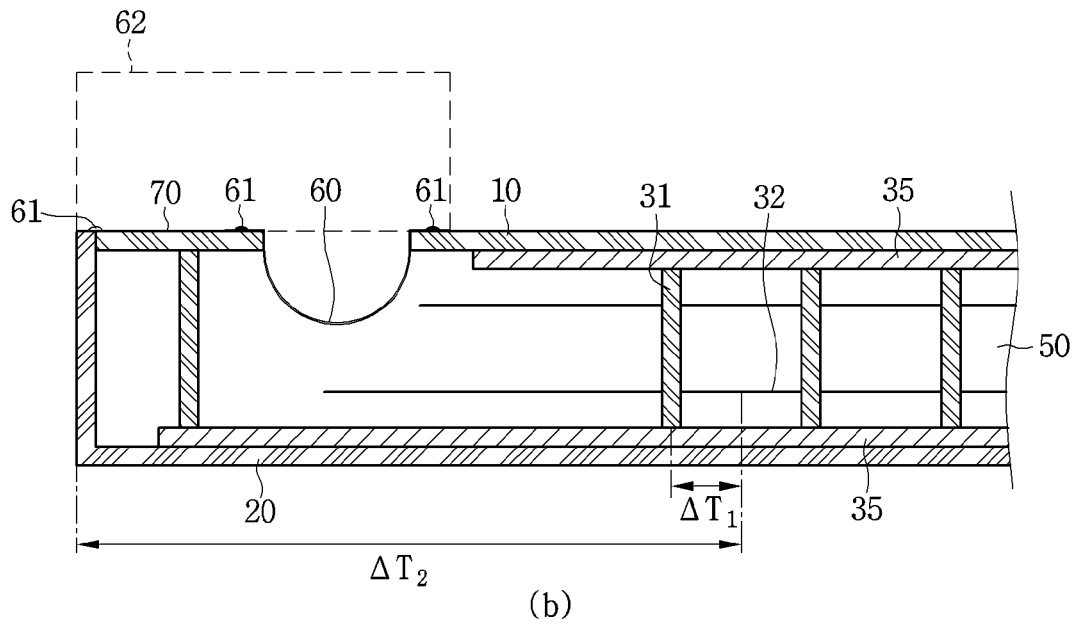
(b)
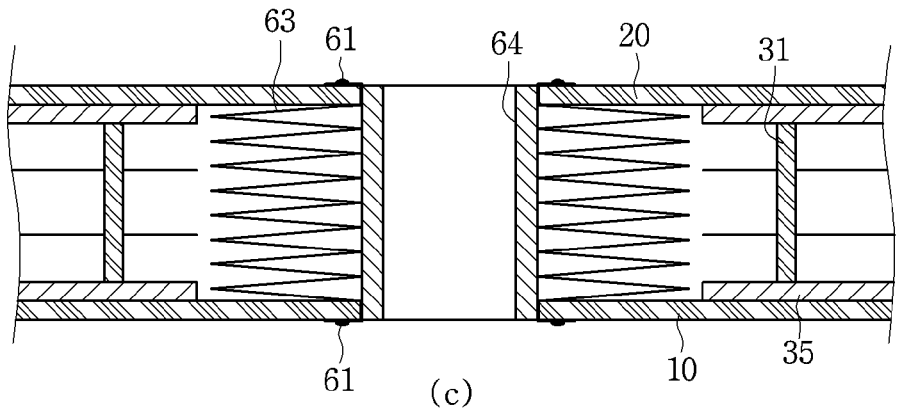
(c)

[Fig. 5]
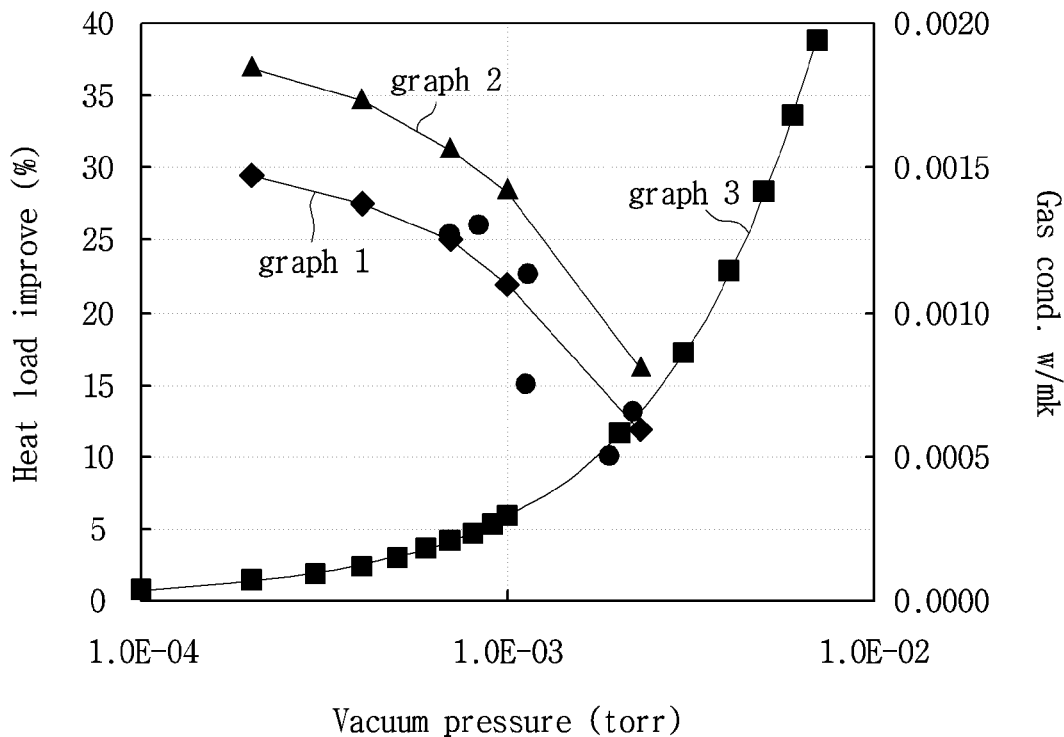
[Fig. 6]
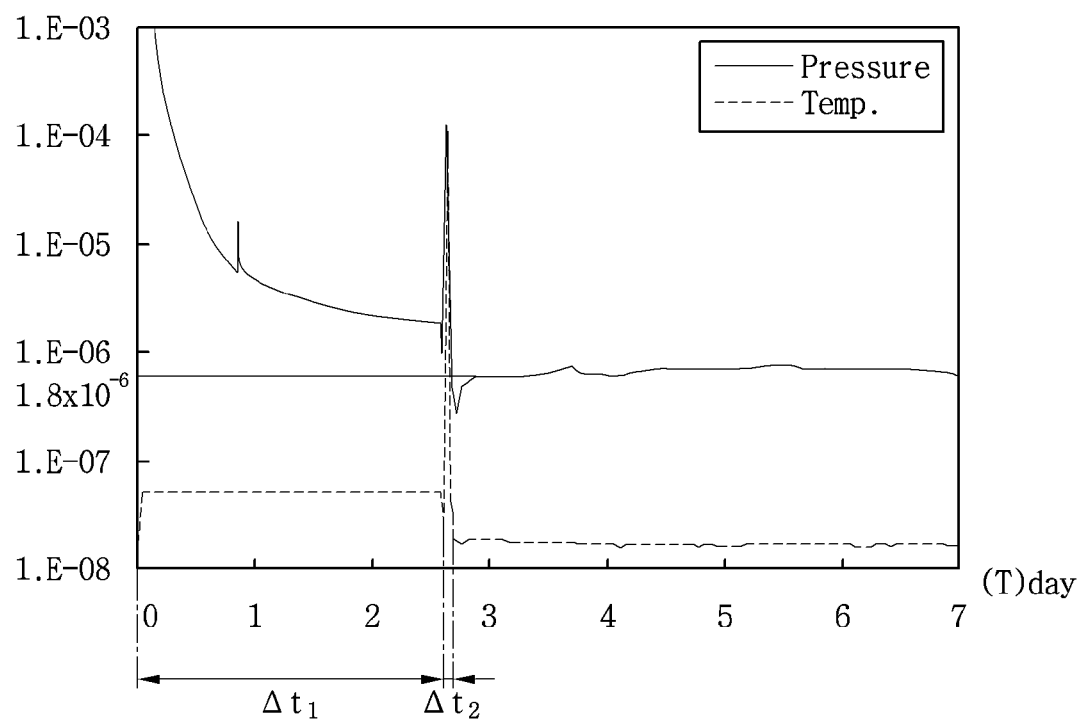

[Fig. 7]
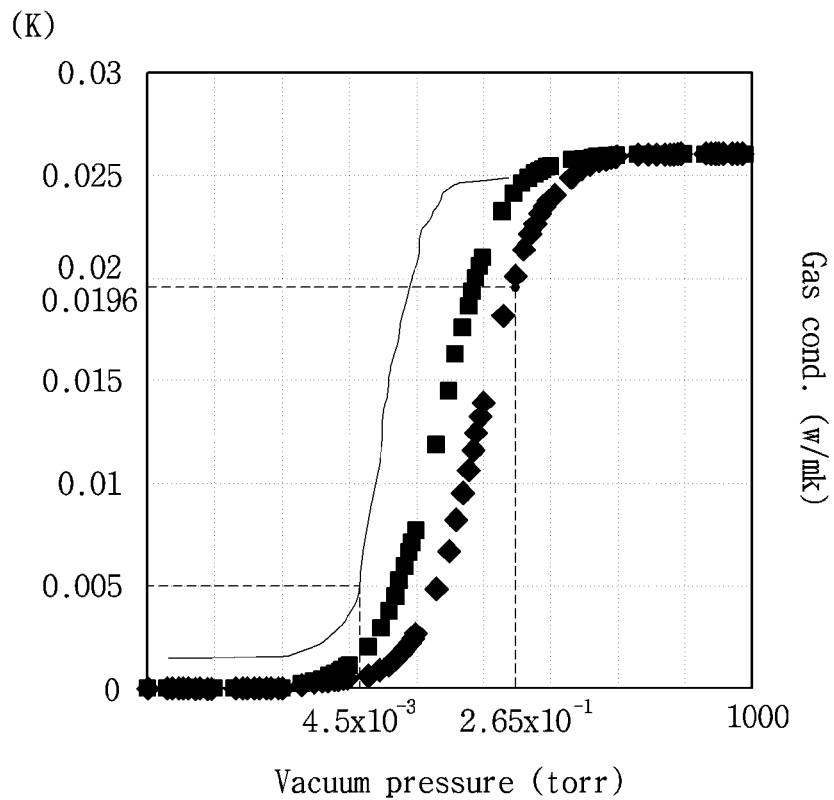

[Fig. 8]
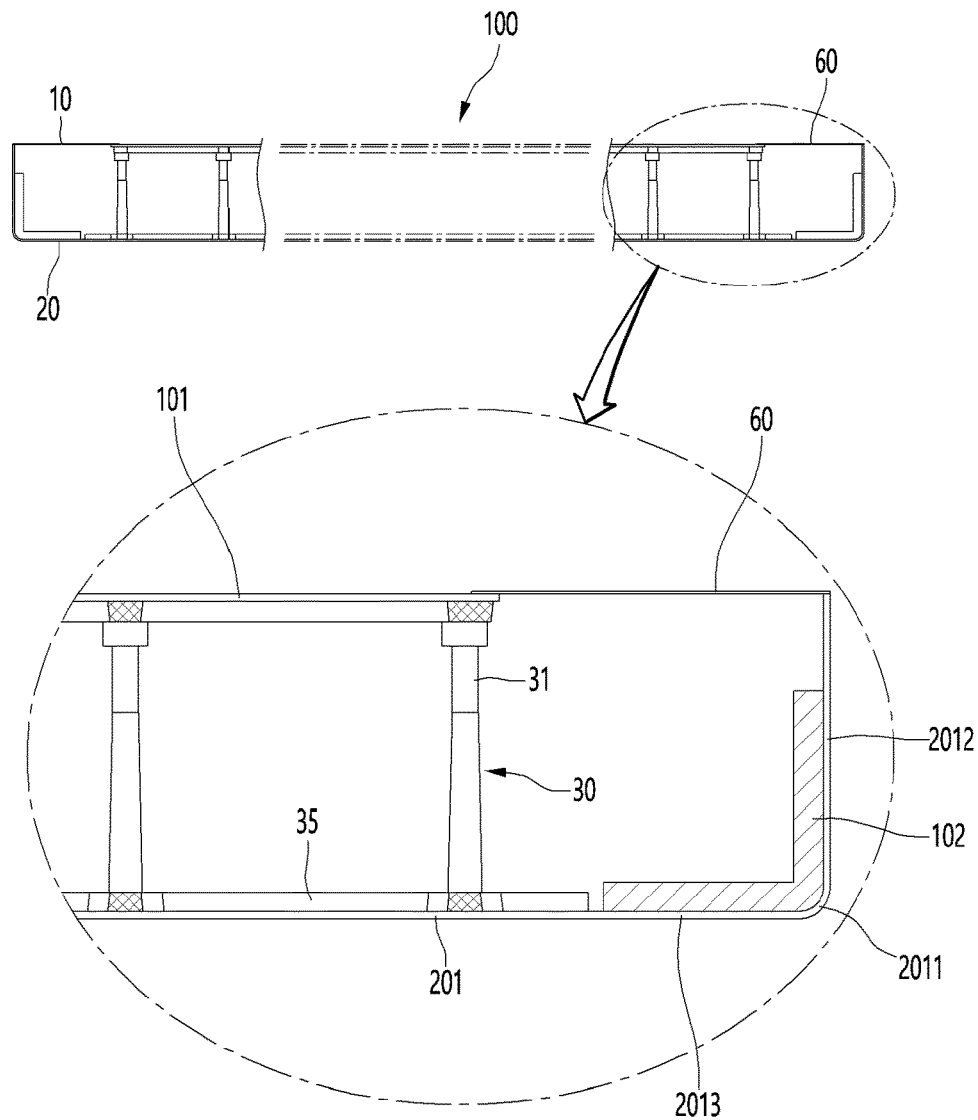
[Fig. 9]
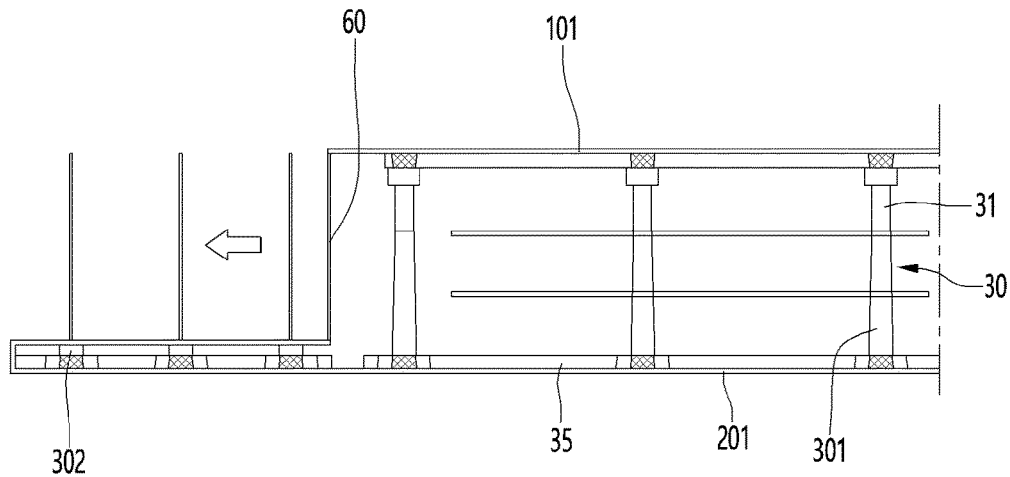

[Fig. 10]
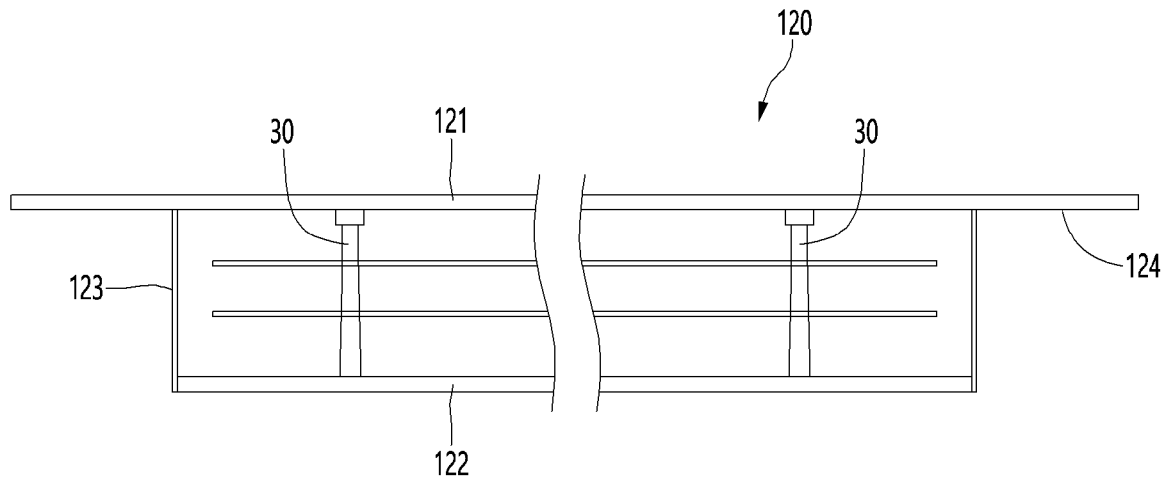
[Fig. 11]
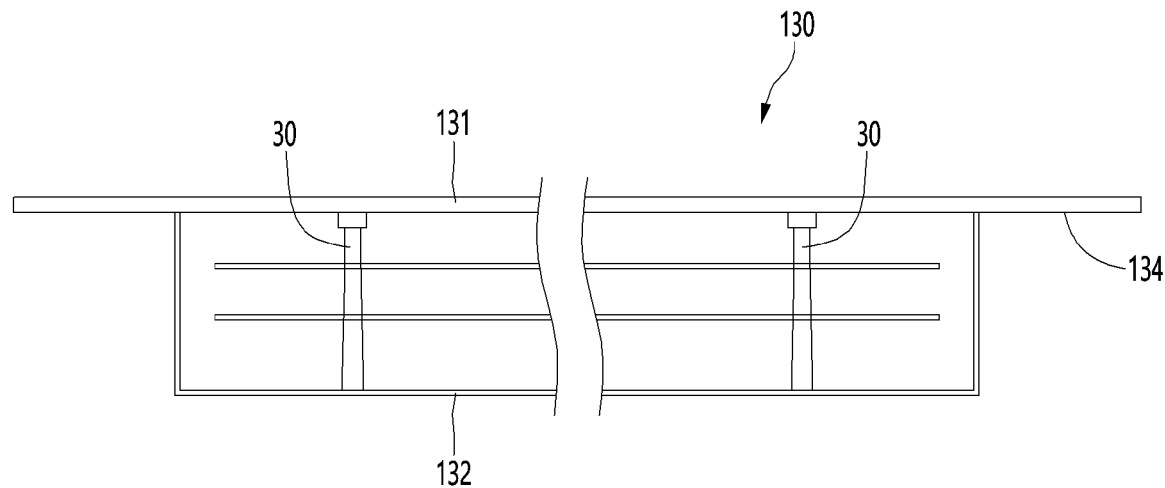
[Fig. 12]
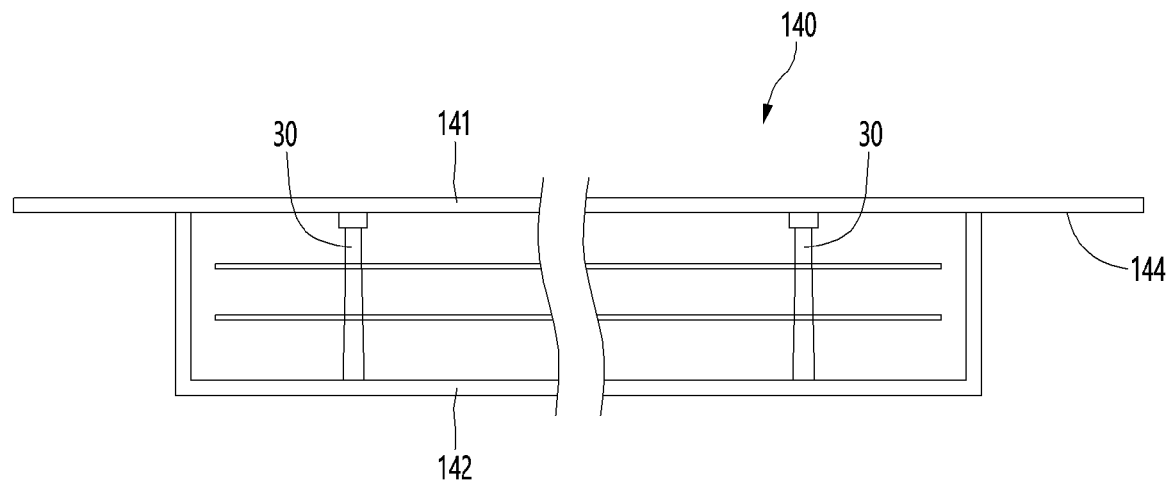

[Fig. 13]
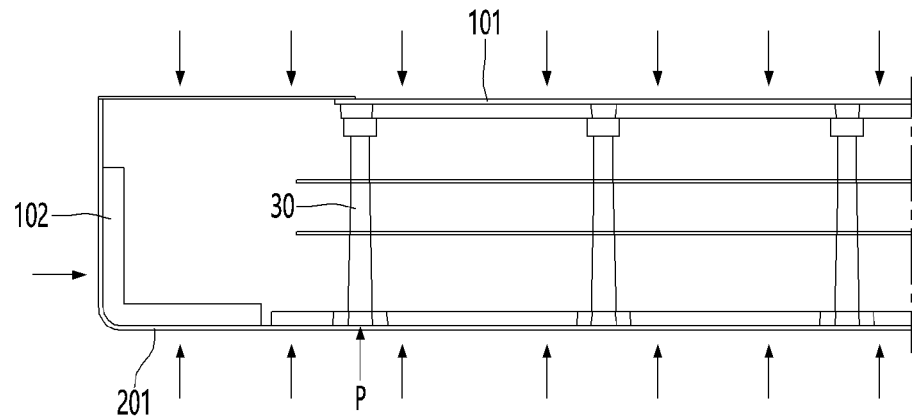
[Fig. 14]
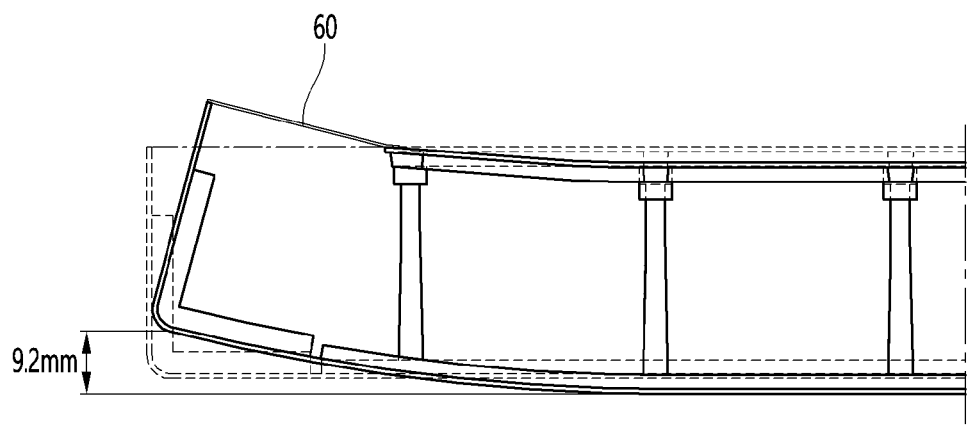
[Fig. 15]
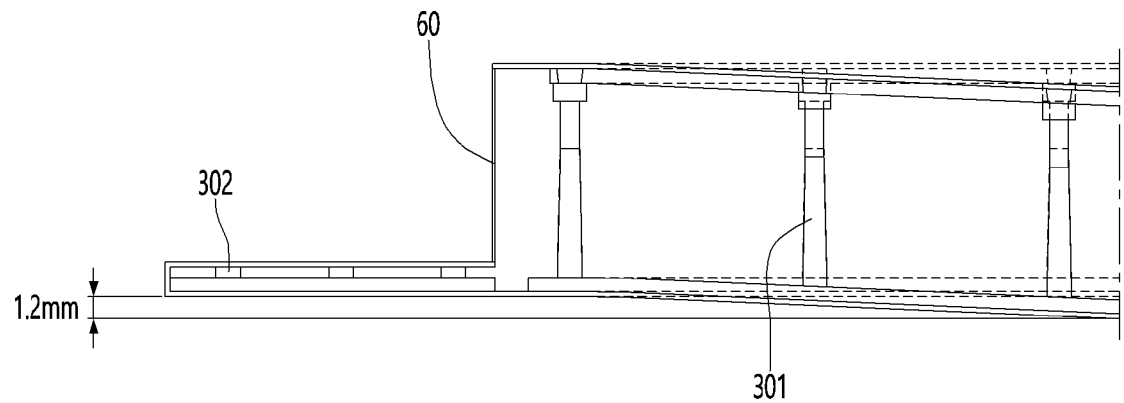

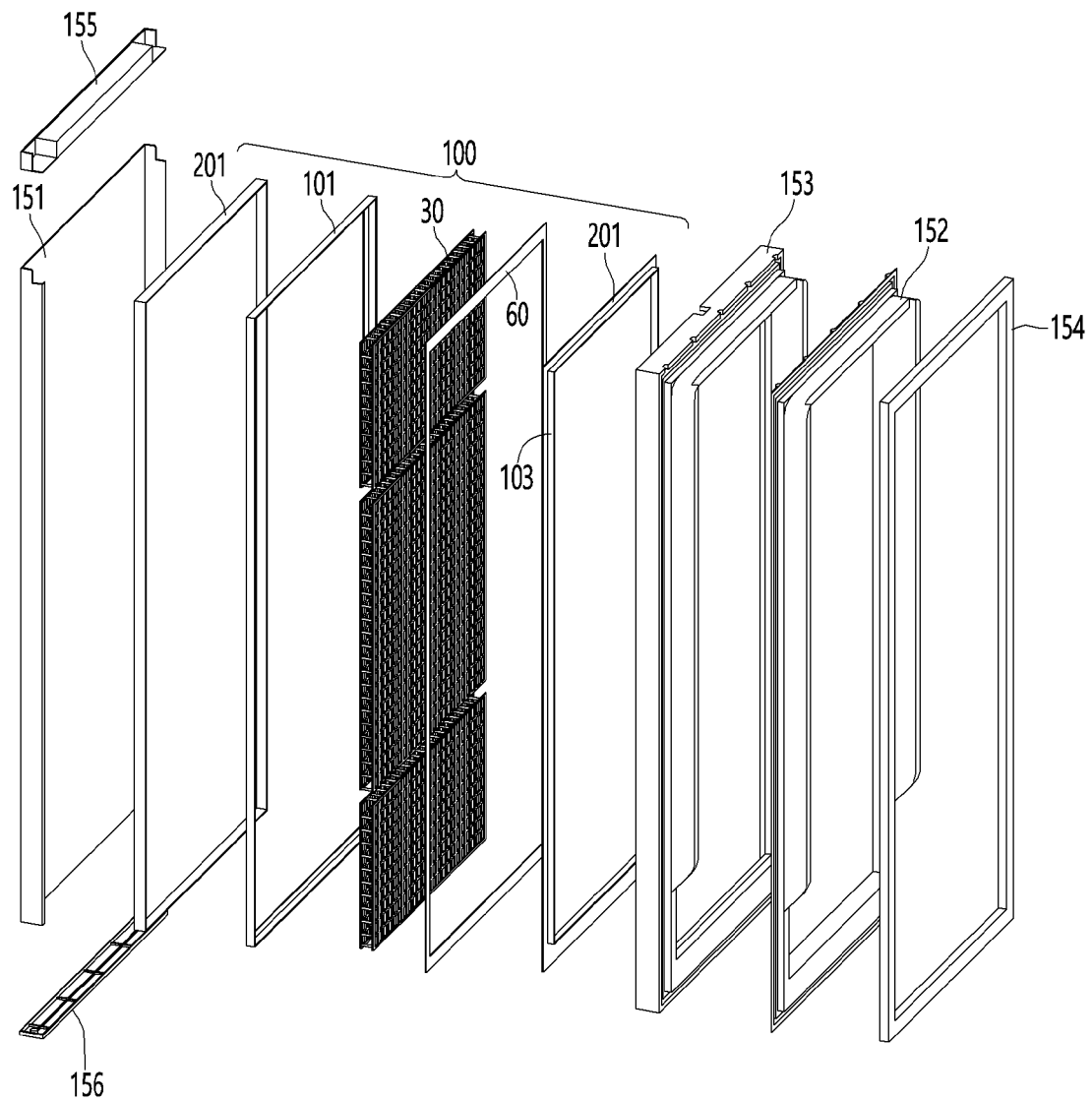
[Fig. 16]

[Fig. 17]
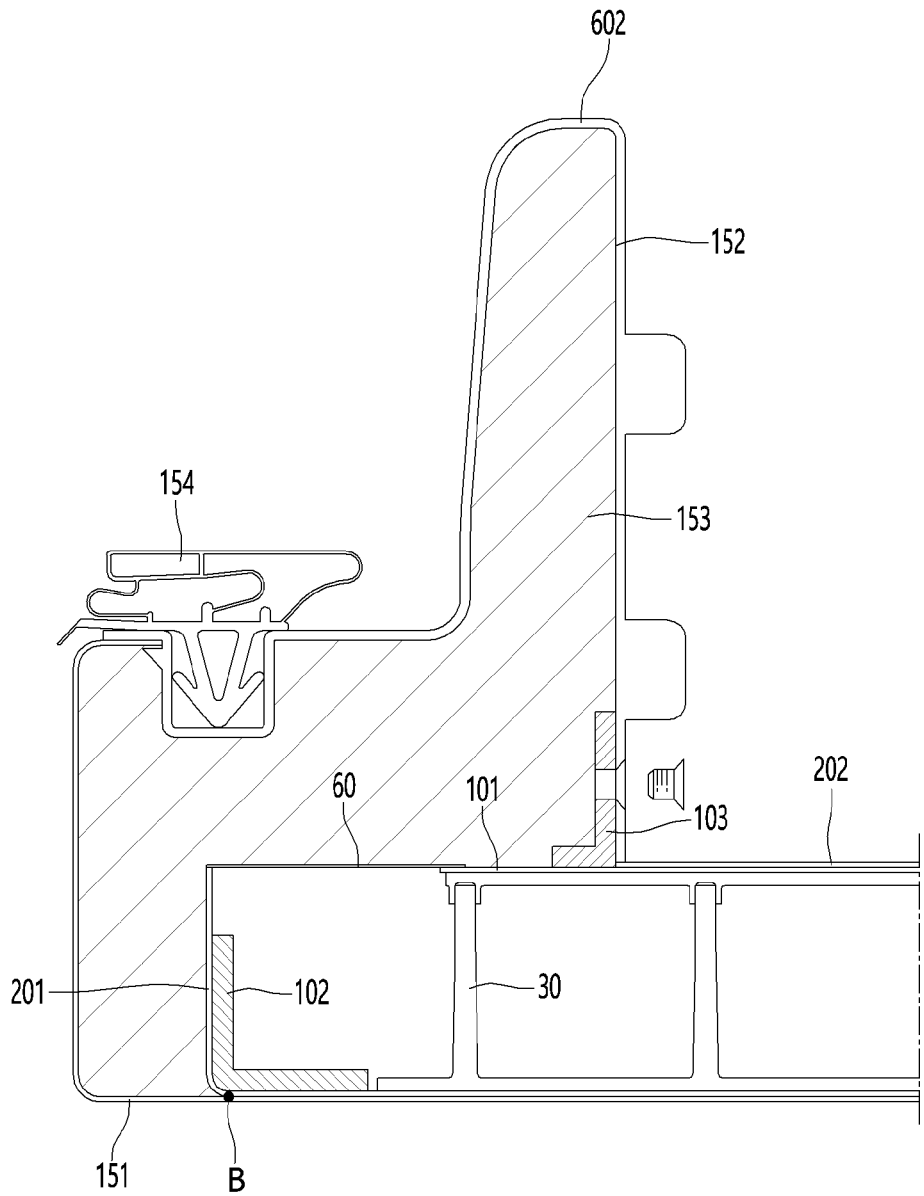

[Fig. 18]
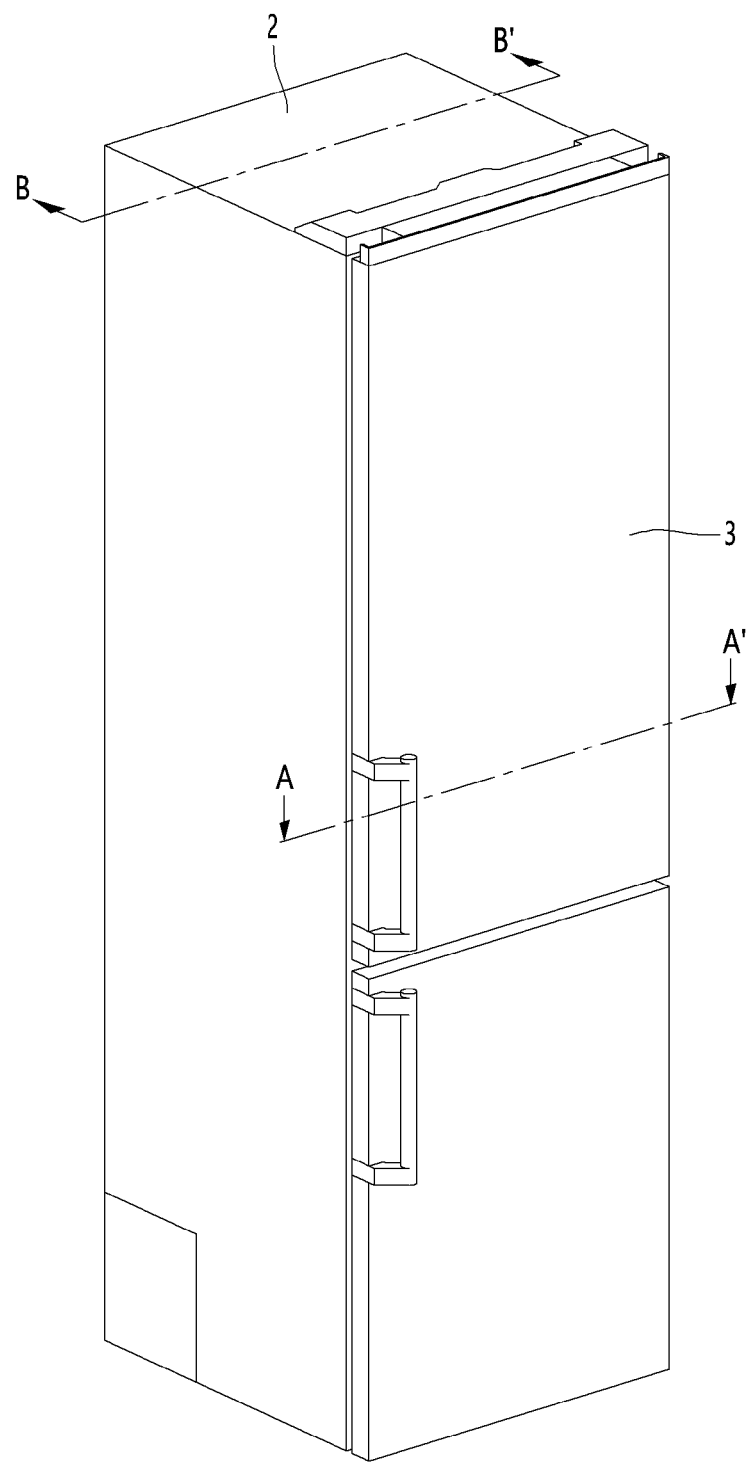

[Fig. 19]
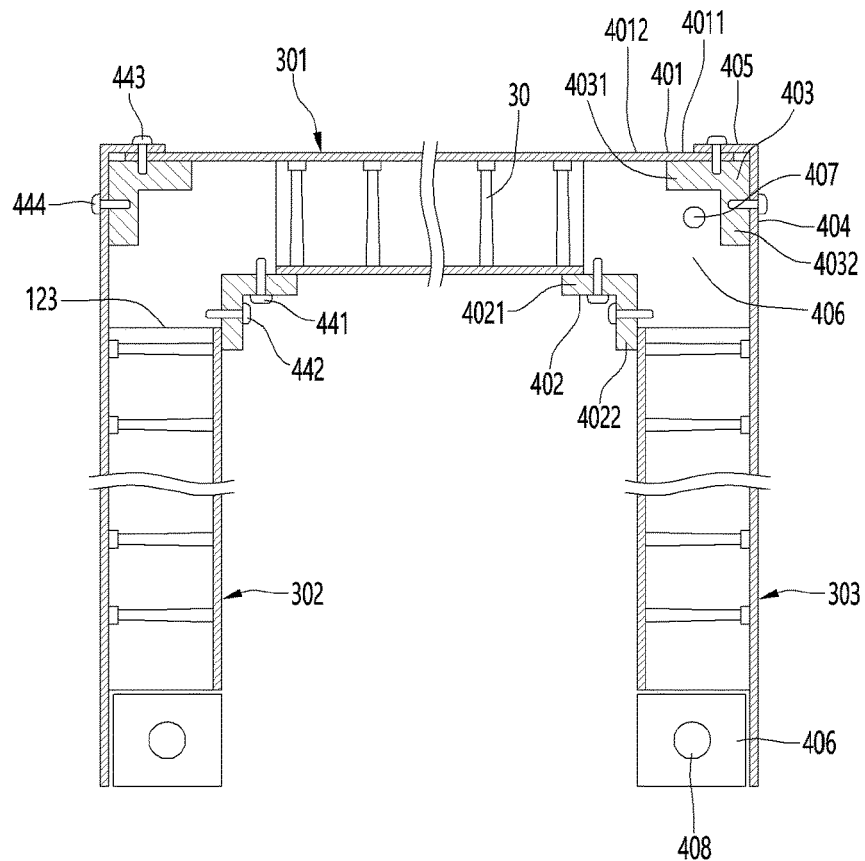
[Fig. 20]
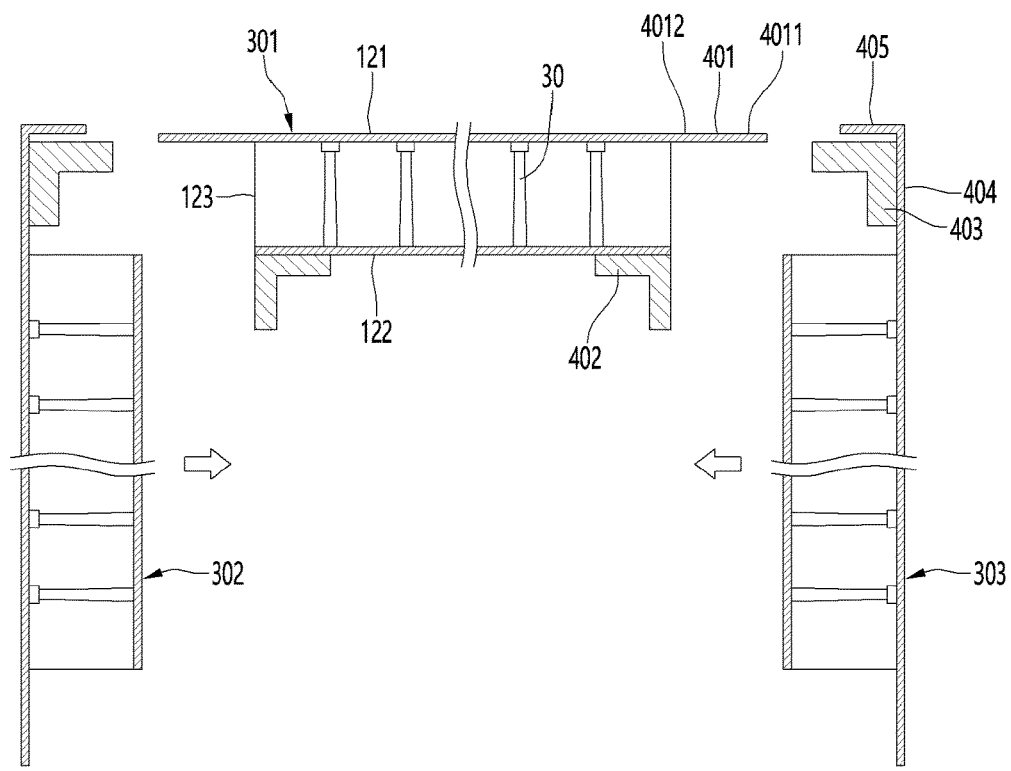

[Fig. 21]
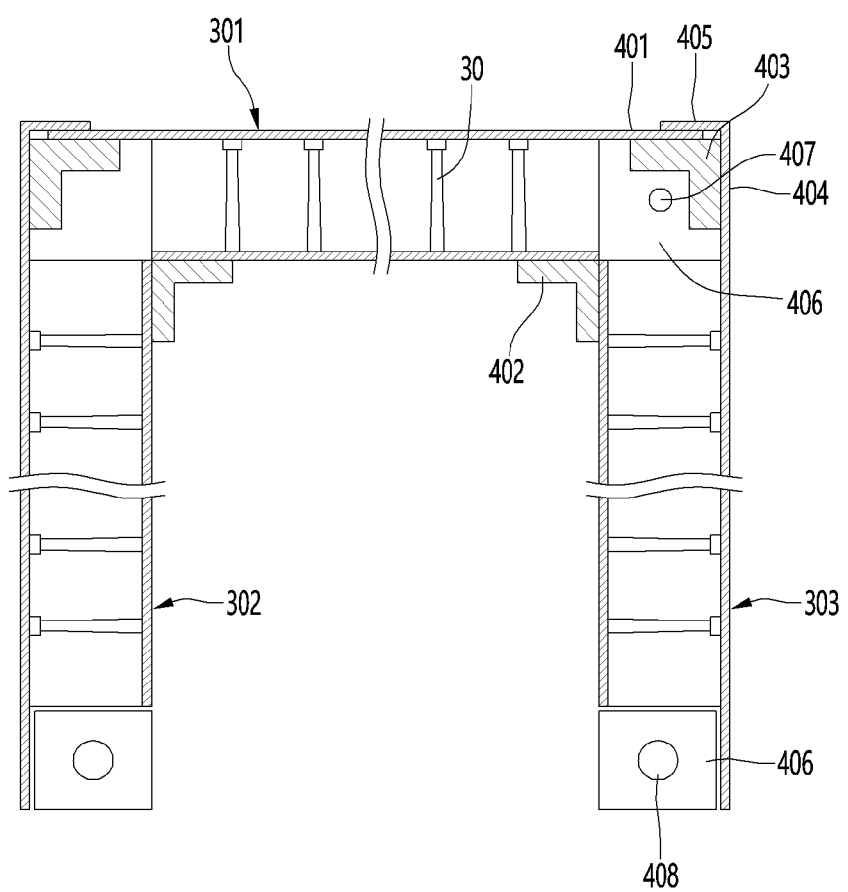

[Fig. 22]
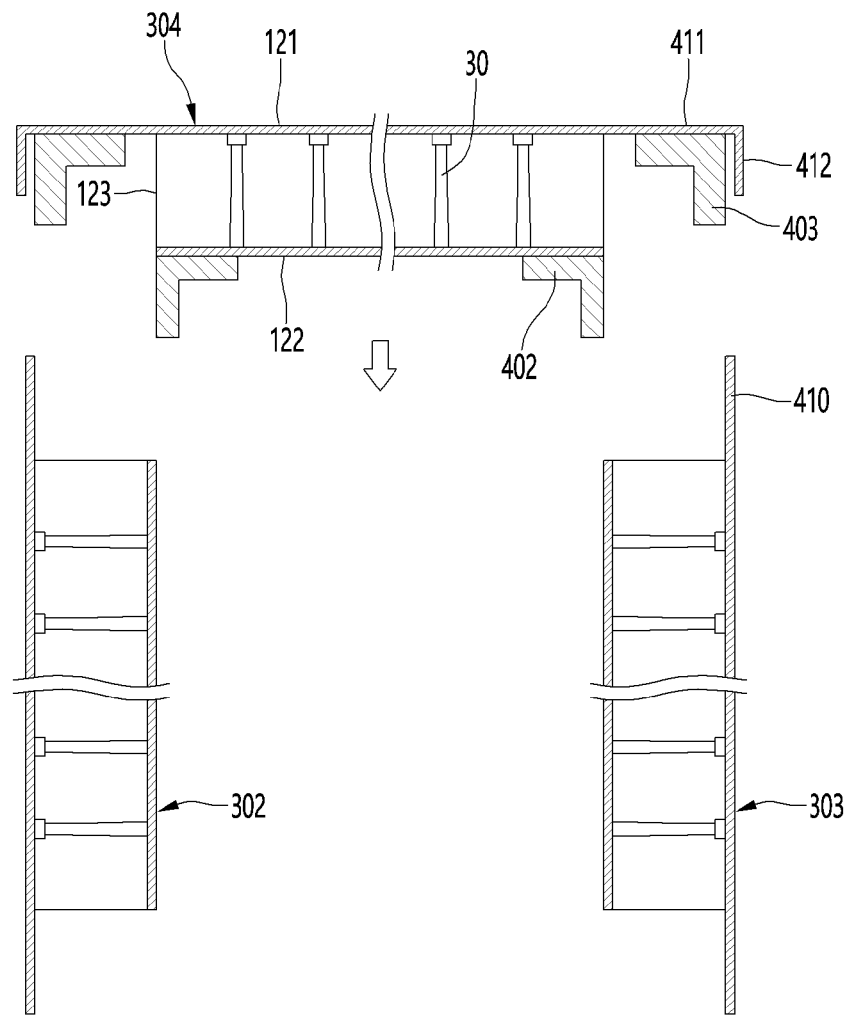

[Fig. 23]
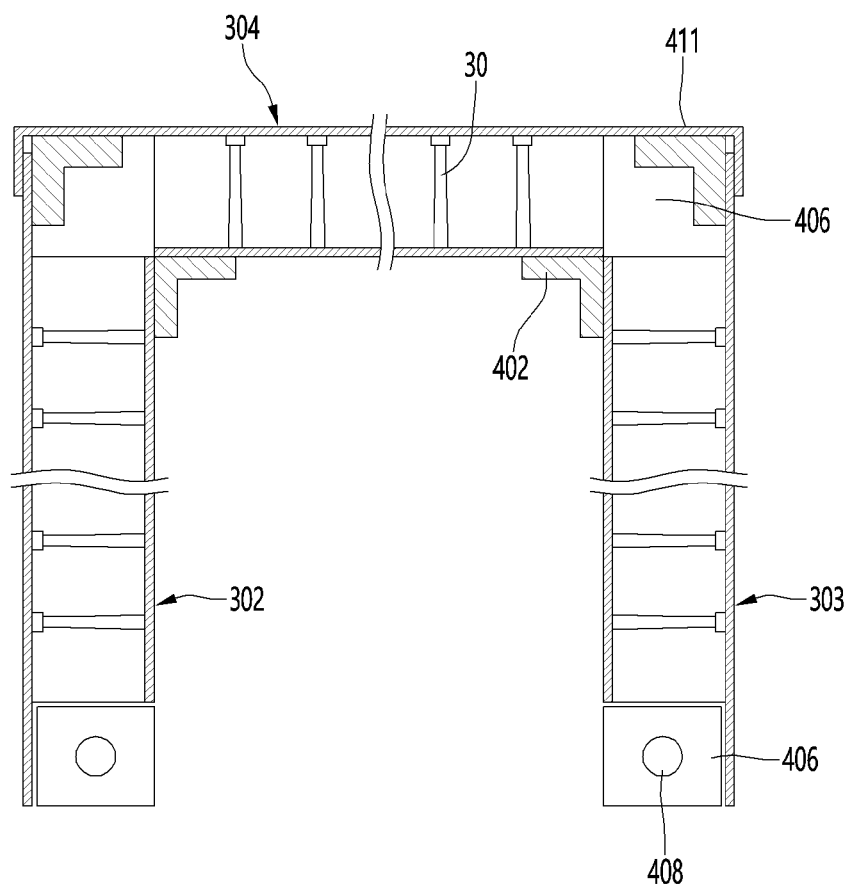

VACUUM ADIABATIC MODULE AND REFRIGERATOR

CROSS-REFERENCE TO RELATED PATENT APPLICATIONS

This application is a U.S. National Stage Application under 35 U.S.C. §371 of PCT Application No. PCT/KR2020/008967, filed Jul. 8, 2020, which claims priority to Korean Patent Application No. 10-2019-0082683, filed Jul. 9, 2019, whose entire disclosures are hereby incorporated by reference.

TECHNICAL FIELD

The present disclosure relates to a vacuum adiabatic module and a refrigerator.

BACKGROUND ART

A vacuum adiabatic body is a product for suppressing heat transfer by vacuuming the inside of a main body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the outside of the vacuum adiabatic panel is finished with a separate molding as Styrofoam. According to the method, additional foaming is not required, and the adiabatic performance of the refrigerator is improved. However, fabrication cost increases, and a fabrication method is complicated.

As another example, a technique of providing walls using a vacuum adiabatic material and additionally providing adiabatic walls using a foam filling material has been disclosed in Korean Patent Publication No. 10-2015-0012712 (Reference Document 2). Also, fabrication cost increases, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2004/0226956A1 (Reference Document 3). However, it is difficult to obtain a practical level of an adiabatic effect by providing a wall of the refrigerator with sufficient vacuum. In detail, there are limitations that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

Alternatively, a vacuum adiabatic body and a refrigerator are disclosed in Korean Patent Publication No. 10-2017-0016187 (Reference Document 4). The present technology proposes a refrigerator in which both a main body and a door are provided with a vacuum adiabatic body. The vacuum adiabatic body only performs an adiabatic operation by itself, and the necessary components have to be installed in a product such as a refrigerator to which the vacuum adiabatic body is applied, but this has not been considered.

As another method, a technology in which a plurality of vacuum adiabatic panels are fixed to a frame to provide a vacuum adiabatic body and a refrigerator is disclosed in US Patent Publication No. US2013/0257256A1 (Reference Document 5). The above technique has the following limitations. There is a limitation in that coupling between a vacuum adiabatic panel and a frame is difficult. There is a great risk of an adiabatic loss due to a gap between the vacuum adiabatic panel and the frame due to defective coupling. Since the frame acts as a portion connecting the inside to the outside of the refrigerator, an inner space may be deteriorated in adiabatic efficiency.

DISCLOSURE OF INVENTION

Technical Problem

Embodiments provide a vacuum adiabatic module, in which a component is applied to enable modular processing that is capable of being applied to various places, and a refrigerator.

Embodiments also provide a vacuum adiabatic module in which there is little cool air leakage through an adiabatic wall to improve adiabatic efficiency, and a refrigerator.

Embodiments also provide a vacuum adiabatic module, in which an amount of heat passing between the inside and the outside of a refrigerator is reduced in fabrication of a door and a main body, and a refrigerator.

Solution to Problem

In one embodiment, a vacuum adiabatic module includes: an inner cover corresponding to an inner space; an outer cover corresponding to an outer space, the outer cover being provided to be larger than the inner cover; a vacuum space which is defined as inner spaces of the outer cover and the inner cover and is in a vacuum state; and a conductive resistance sheet provided on a connection portion between the inner cover and the outer cover to resist to thermal conduction. The vacuum adiabatic module may be more conveniently applied to the refrigerator and easily handled to easily fabricate the refrigerator.

The outer cover may include: an outer surface corresponding to the outer space; a side surface extending in a direction different from an extension direction of the outer surface; and a bent portion to which the side surface and the outer surface are bent to be connected. Accordingly, an enclosure of the refrigerator may be more conveniently realized.

The vacuum adiabatic module may further include a first reinforcement frame placed in the vacuum space to contact all of the outer surface, the side surface, and the bent portion. Accordingly, the modules may be easily coupled to each other.

Since the conductive resistance sheet has the same extension direction as an extension direction of the inner cover, a separate structure, i.e., a sheet may not be required.

Since a second reinforcement frame coupled to the inner cover is provided, the modules adjacent to each other may be easily coupled to each other.

The inner cover may have a thickness less than that of the outer cover to resist to the thermal conduction.

Since the outer cover further extends to the outside of the inner cover, the modules may be more easily coupled to each other.

The vacuum adiabatic module may further include a coupling frame provided in at least one of the outer cover or the inner cover. Accordingly, the modules adjacent to each other may be conveniently coupled to each other by oneself without a separate coupling structure.

A coupling edge further extending from the vacuum space so to be coupled to other components may be provided in the outer cover. Since the coupling edge is coupled to the modules adjacent to each other, the modules may be coupled to each other without having an influence on the vacuum space.

In another embodiment, a refrigerator includes: a main body having an accommodation space and an opening configured to allow access to the accommodation space; and a door configured to open and close the accommodation space, wherein the main body includes first and second adiabatic modules having adiabatic degrees different from each other, wherein the first adiabatic module includes: an inner cover configured to define at least a portion of a wall for a first space; an outer cover configured to define at least a portion of a wall for a second space having a temperature different from that of the first space; a seal configured to seal the inner cover and the outer cover to provide a third space that has a temperature between a temperature of the first space and a temperature of the second space and is in a vacuum state; a support configured to maintain an interval of the third space; and a conductive resistance sheet configured to connect the inner cover to the outer cover to reduce a heat transfer amount between the inner cover and the outer cover, wherein the conductive resistance sheet is thinner than at least one of the inner cover or the outer cover, the second adiabatic module is provided to have an adiabatic degree less than that of the first adiabatic module and disposed to contact side surfaces of a plurality of first adiabatic modules so as to connect the plurality of first adiabatic modules to each other, and the first adiabatic module is provided in plurality, and an inner coupling frame configured to connect one inner cover of the plurality of first adiabatic modules to the other inner cover of the plurality of first adiabatic modules is additionally provided. Accordingly, the refrigerator may be conveniently fabricated without leakage of cool air.

The inner coupling frame may include a first portion and a second portion to surround an edge of a wall configured to define the first space. Accordingly, the coupling between the modules may be conveniently performed.

The first portion of the inner coupling frame may be disposed to cover or overlap the inner cover of the at least one first adiabatic module configured to define a rear surface of the refrigerator and a portion to which the conductive resistance sheet of the at least one first adiabatic module is coupled. Accordingly, an adiabatic wall may be provided to define an inner space and shield heat transfer.

One portion of the first portion of the inner coupling frame may be disposed to contact the inner cover of the at least one first adiabatic module, and the other portion of the first portion of the inner coupling frame may be disposed to contact the second adiabatic module. Accordingly, the connection portion between the modules may be more firmed to provide high adiabatic performance.

The first and second adiabatic modules may further include a coupling portion, and the coupling portion may be disposed at a position that is spaced a predetermined distance from the conductive resistance sheet in a direction of the second adiabatic module. Accordingly, the modules may be more firmly coupled to each other without a heat loss.

The conductive resistance sheet may have one surface facing the third space and the other surface facing the second adiabatic module. Accordingly, thermal conduction reduction performance through the conductive resistance sheet may be improved.

The refrigerator may further include a rear surface coupling edge extending from the outer cover of the at least one first adiabatic module toward the other first adiabatic module. Accordingly, a space in which the second adiabatic module is disposed may be conveniently provided to improve the adiabatic performance.

The inner coupling frame may be disposed to overlap the rear surface coupling edge in a state of being spaced a predetermined distance from the rear surface edge, thereby achieving more firm structural strength in the refrigerator.

The second adiabatic module may be disposed between the inner coupling frame and the rear surface coupling edge. Accordingly, more improved adiabatic performance may be secured.

The second adiabatic module may have a through-hole through which at least one of an electric line, a refrigerant pipe, a cool air passage, or a water flowing pipe passes. Accordingly, an additional portion required for an operation of the refrigerator may be conveniently provided.

In further another embodiment, a refrigerator includes: a main body having an accommodation space; and a door configured to open and close the accommodation space, wherein at least one of the main body or the door includes: a vacuum adiabatic module of which an inside is provided in a high vacuum state to perform an adiabatic operation; and an adiabatic portion made of a nonmetal material, which is provided on an edge of the vacuum adiabatic module. Accordingly, the adiabatic modules that operate in different manners may be applied. Therefore, the effect of high adiabatic performance, high structural strength, and convenience of fabrication may be obtained.

Advantageous Effects of Invention

According to the embodiment, the vacuum adiabatic body may be modularized into the vacuum adiabatic module to reduce the stock costs, be easy in fabrication, improve the productivity, and reduce the costs.

According to the embodiment, since the vacuum adiabatic modules themselves are coupled to each other, and there is no cool air leakage at the coupling interval, the cool air leakage through the adiabatic wall may be prevented to improve the energy efficiency of the refrigerator.

According to the embodiment, the deformation of components due to the high vacuum in fabricating the components for modularization may be prevented to improve the reliability of the finished product.

BRIEF DESCRIPTION OF DRAWINGS

FIG. 1 is a perspective view of a refrigerator according to an embodiment.

FIG. 2 is a view schematically illustrating a vacuum adiabatic body used in a main body and a door of the refrigerator.

FIG. 3 is a view illustrating an internal configuration of a vacuum space according to various embodiments.

FIG. 4 is a view illustrating a conductive resistance sheet and a peripheral portion thereof according to various embodiments.

FIG. 5 is a graph illustrating a variation in adiabatic performance and a variation in gas conductivity according to a vacuum pressure by applying a simulation.

FIG. 6 is a graph illustrating results obtained by observing a time and a pressure in a process of exhausting the inside of the vacuum adiabatic body when a support is used.

FIG. 7 is a graph illustrating results obtained by comparing a vacuum pressure to gas conductivity.

FIG. 8 is a cross-sectional view of a first door vacuum adiabatic module.

FIG. 9 is a cross-sectional view illustrating a corner of a second door vacuum adiabatic module.

FIG. 10 is a cross-sectional view of a first main body vacuum adiabatic module.

FIG. 11 is a cross-sectional view of a second main body vacuum adiabatic module.

FIG. 12 is a cross-sectional view of a third main body vacuum adiabatic module.

FIG. 13 is a view for explaining a pressure of the first door vacuum adiabatic module.

FIG. 14 is a view illustrating results obtained by simulating deformation of the first door vacuum adiabatic module.

FIG. 15 is a view illustrating results obtained by simulating deformation of the second door vacuum adiabatic module.

FIG. 16 is an exploded perspective view of a door to which the door vacuum adiabatic module is applied according to an embodiment.

FIG. 17 is a cross-sectional view illustrating an edge of the door.

FIG. 18 is a perspective view of a refrigerator to which the main body vacuum adiabatic module is applied according to an embodiment.

FIG. 19 is a cross-sectional view illustrating the main body of the refrigerator of FIG. 18, taken along line A-A', according to an embodiment.

FIGS. 20 and 21 are cross-sectional views illustrating the main body of the refrigerator of FIG. 18, taken along line A-A', according to another embodiment.

FIGS. 22 and 23 are cross-sectional views illustrating the main body of the refrigerator of FIG. 18, taken along line B-B', according to another embodiment.

MODE FOR THE INVENTION

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

Hereinafter, for description of embodiments, the drawings shown below may be displayed differently from the actual product, or exaggerated or simple or detailed parts may be deleted, but this is intended to facilitate understanding of the technical idea of the present invention. It should not be construed as limited. However, it will try to show the actual shape as much as possible.

The following embodiments may be applied to the description of another embodiment unless the other embodiment does not collide with each other, and some configurations of any one of the embodiments may be modified in a state in which only a specific portion is modified in another configuration may be applied.

In the following description, the vacuum pressure means any pressure state lower than the atmospheric pressure. In addition, the expression that a vacuum degree of A is higher than that of B means that a vacuum pressure of A is lower than that of B.

In this embodiment, an adiabatic module having a vacuum space defined therein may be referred to as a first adiabatic module.

Examples of the first adiabatic module may include a first door vacuum adiabatic module 100 of FIG. 8, a second door vacuum adiabatic module 110 of FIG. 9, a first main body vacuum adiabatic module 120 of FIG. 10, a second main body vacuum adiabatic module 130 of FIG. 11, a third main body vacuum adiabatic module 140 of FIG. 12, a first vacuum adiabatic module and a left surface vacuum adiabatic module 302 of FIGS. 19 and 20, and a top surface vacuum adiabatic module 304, the left surface vacuum adiabatic module 302, and a right surface vacuum adiabatic module 303 of FIGS. 21 and 23.

As modified example, the vacuum adiabatic module of FIGS. 8 to 9 may be applied to the main body.

As another modified example, the vacuum adiabatic module of FIGS. 10 to 12 may be applied to the door.

The first vacuum adiabatic module includes a first plate 10 defining at least a portion of a wall for the first space and a second plate 20 defining at least a portion of a wall for the second space and having a temperature different from the first space.

The first plate 10 may include a plurality of layers. The second plate 20 may include a plurality of layers.

The first adiabatic module may further include a seal configured to seal the first plate 10 and the second plate 20 so as to provide a third space that is in a vacuum state and having a temperature between a temperature of the first space and a temperature of the second space.

When one of the first and second plates is disposed in an inner space of the third space, the plate may be represented by inner covers 101, 122, 132, and 142. When the other one of the first and second plates is disposed in an outer space of the third space, the plate may be represented by outer covers 201, 121, 131, and 141. For example, the inner space of the third space may be a storage space of the refrigerator. The outer space of the third space may be an outer space of the refrigerator.

Hereinafter, an example in which the first plate 10 is defined as the inner covers 101, 122, 132, and 142, and the second plate 20 is defined as the outer cover 201, 121, 131, and 141 will be described.

The first adiabatic module may further include a support that maintains the third space.

The first adiabatic module may further include conductive resistance sheets 60 and 123 connecting the inner covers 101, 122, 132, and 142 to the outer covers 201, 121, 131, and 141 so as to reduce an amount of heat transfer between the inner covers 101, 122, 132, and 142 and the outer covers 201, 121, 131, and 141.

At least a portion of the conductive resistance sheets 60 and 123 may be disposed to face the third space. The conductive resistance sheets 60 and 123 may be disposed between edges of the inner covers 101, 122, 132, and 142 and edges of the outer covers 201, 121, 131, and 141. The conductive resistance sheets 60 and 123 may be disposed between a surface facing the first space of the inner covers 101, 122, 132, and 142 and a surface facing the second space of the outer covers 201, 121, 131, and 141. The conductive resistance sheets 60 and 123 may be disposed between side surfaces of the inner covers 101, 122, 132, and 142 and side surfaces of the outer covers 201, 121, 131, and 141.

At least a portion of the conductive resistance sheets 60 and 123 may extend in a direction that is substantially the same as a direction in which the inner covers 101, 122, 132, and 142 extend.

Each of the conductive resistance sheets 60 and 123 may have a thickness to be thinner than at least one of the inner covers 101, 122, 132, and 142 or the outer covers 201, 121, 131, and 141. The thinner each of the conductive resistance sheets 60 and 123, the less heat transfer between the inner covers 101, 122, 132, and 142 and the outer covers 201, 121, 131, and 141.

One end of each of the conductive resistance sheets 60 and 123 may be disposed to overlap at least a portion of each of the inner covers 101, 122, 132, and 142. This is done for providing a space for coupling the one end of each of the conductive resistance sheets 60 and 123 to each of the inner covers 101, 122, 132, and 142. The coupling method may include welding.

The other end of each of the conductive resistance sheets 60 and 123 may be disposed to overlap at least a portion of each of the outer covers 201, 121, 131, and 141. This is done for providing a space for coupling the other end of each of the conductive resistance sheets 60 and 123 to each of the outer covers 201, 121, 131, and 141. The coupling method may include welding.

As each of the conductive resistance sheets 60 and 123 decreases in thickness, the heat transfer may be reduced. However, there is difficult to couple the conductive resistance sheets 60 and 123 between the inner covers 101, 122, 132, and 142 and the outer covers 201, 121, 131, and 141.

As another embodiment for replacing the conductive resistance sheets 60 and 123, the conductive resistance sheets 60 and 123 are removed, and one of the inner covers 101, 122, 132, and 142 and the outer covers 201, 121, 131, and 141 may have a thickness less than that of the other one of the inner covers 101, 122, 132, and 142 and the outer covers 201, 121, 131, and 141. In this case, the thickness of the one of the inner covers 101, 122, 132, and 142 and the outer covers 201, 121, 131, and 141 may be greater than that of each of the conductive resistance sheets 60 and 123. In this case, one of the inner covers 101, 122, 132, and 142 and the outer covers 201, 121, 131, and 141 may have a length greater than that of each of the conductive resistance sheets 60 and 123. In such a configuration, an increase in heat transfer may be reduced while removing the conductive resistance sheets 60 and 123. Also, difficulty in coupling the inner covers 101, 122, 132, and 142 to the outer covers 201, 121, 131, and 141 may be reduced.

At least a portion of the inner covers 101, 122, 132, and 142 and at least a portion of the outer covers 201, 121, 131, and 141 may be arranged to overlap each other. This is done for providing a space for coupling the inner covers 101, 122, 132, and 142 to the outer covers 201, 121, 131, and 141. An additional cover may be disposed on one cover having a thin thickness among the inner covers 101, 122, 132, and 142 and the outer covers 201, 121, 131, and 141. This is done for protecting the thin cover.

In this embodiment, the adiabatic module having different characteristics from the first adiabatic module may be expressed as a second adiabatic module. For example, a foam portion 406 may be referred to as a second adiabatic module.

The second adiabatic module may have an adiabatic degree less than that of the first adiabatic module.

The second adiabatic module may have a vacuum level less than that of the first adiabatic module.

The second adiabatic module may be a non-vacuum adiabatic module of which the inside is in a non-vacuum state.

The second adiabatic module may be made of a nonmetal.

The second adiabatic module may be made of a resin or foamable polyurethane (PU).

The second adiabatic module may be an adiabatic module on which more components than the first adiabatic module are mounted. When compared to the first adiabatic module, it may be convenient to mount or couple the components. Since the first adiabatic module has a vacuum space defined therein, there may be difficult to mount or couple the components. For example, components for the door such as a door gasket, a door hinge, a heater, or a hot line may be connected to or coupled to the second adiabatic module.

The second adiabatic module may be an adiabatic module having more through-holes than the first adiabatic module. The through-hole may be provided to provide at least one of a pipeline through which electricity flows, a pipeline through which a refrigerant flows, a pipeline through which cool air or hot air flows, and a pipeline through which water flows. The first adiabatic module has a vacuum space therein and thus may have difficulty in forming the through-hole.

When the first adiabatic module is provided in plurality, the second adiabatic module may be disposed between the plurality of first adiabatic modules. The first adiabatic module may be a medium by which the plurality of first adiabatic modules are coupled to each other. At least one surface of the second adiabatic module may be connected to or coupled to one of the plurality of first adiabatic modules. At least the other surface of the second adiabatic module may be connected to or coupled to the other one of the plurality of first adiabatic modules. In this case, work convenience in connecting or coupling the plurality of first adiabatic modules to each other may be improved.

The second adiabatic module may be disposed on an outer surface of one of the first and second plates of the first adiabatic module. The second adiabatic module may be a medium for mounting a component that needs to be coupled to the first adiabatic module. One surface of the second adiabatic module may be connected to or coupled to one of the first and second plates. The other surface of the second adiabatic module may be connected to or coupled to the component. In this case, work convenience in connecting or coupling the components to the first adiabatic module may be improved.

The second adiabatic module may be disposed to cover at least a portion of the conductive resistance sheets 60 and 123 of the first adiabatic module. At least a portion of the second adiabatic module may be disposed to overlap the conductive resistance sheets 60 and 123 of the first adiabatic module. The second adiabatic module may be a protective device to reduce damage to the conductive resistance sheets 60 and 123. Also, the second adiabatic module may be a medium for mounting components that require for being coupled. One surface of the second adiabatic module may be connected to or coupled to the conductive resistance sheets 60 and 123. The other surface of the second adiabatic module may be connected to or coupled to the component.

The second adiabatic module may be disposed to cover at least a portion of the inner covers 101, 122, 132, and 142 of the first adiabatic module. At least a portion of the second adiabatic module may be disposed to overlap the inner covers 101, 122, 132, and 142 of the first adiabatic module. The second adiabatic module may be a protective device for reducing damage of the inner covers 101, 122, 132, and 142 of the first adiabatic module. Also, the second adiabatic module may be a medium for mounting components that require for being coupled. One surface of the second adiabatic module may be connected to or coupled to the inner covers 101, 122, 132, and 142 of the first adiabatic module. The other surface of the second adiabatic module may be connected to or coupled to the component.

The second adiabatic module may be provided to define at least a portion of a wall connecting a plurality of first adiabatic modules to each other. For example, the inner covers of the plurality of first adiabatic modules define at least a portion of a wall defining the storage space of the refrigerator, and the second adiabatic module disposed between the plurality of first adiabatic modules defines the other portion of the wall defining the storage space.

The second adiabatic module may be arranged to contact side surfaces of the plurality of first adiabatic modules.

FIG. 1 is a perspective view of a refrigerator according to an embodiment.

Referring to FIG. 1, the refrigerator 1 includes a main body 2 provided with a cavity 9 capable of storing storage goods and a door 3 provided to open and close the main body 2. The door 3 may be rotatably or slidably movably disposed to open/close the cavity 9. The cavity 9 may provide at least one of a refrigerating compartment and a freezing compartment.

Components constituting a refrigeration cycle in which cool air is supplied into the cavity 9. In detail, the components include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically illustrating a vacuum adiabatic body used in the main body and the door of the refrigerator. In FIG. 2, a main body-side vacuum adiabatic body is illustrated in a state in which walls of top and side surfaces are removed, and a door-side vacuum adiabatic body is illustrated in a state in which a portion of a wall of a front surface is removed. In addition, sections of portions at conductive resistance sheets are provided are schematically illustrated for convenience of understanding.

Referring to FIG. 2, the vacuum adiabatic body includes a first plate 10 for providing a wall of a low-temperature space, a second plate 20 for providing a wall of a high-temperature space, a vacuum space 50 defined as a gap between the first and second plates 10 and 20. Also, the vacuum adiabatic body includes the conductive resistance sheets 60 and 63 for preventing thermal conduction between the first and second plates 10 and 20. A seal 61 for sealing the first and second plates 10 and 20 is provided so that the vacuum space 50 is in a sealing state. When the vacuum adiabatic body is applied to a refrigerator or a heating cabinet, the first plate 10 may be referred to as an inner case that is installed inside a control space controlling a temperature, and the second plate 20 may be referred to as an outer case that is installed outside the control space. A machine room 8 in which components providing a refrigeration cycle are accommodated is placed at a lower rear side of the main body-side vacuum adiabatic body, and an exhaust port 40 for forming a vacuum state by exhausting air in the vacuum space 50 is provided at any one side of the vacuum adiabatic body. In addition, a pipeline 64 passing through the vacuum space 50 may be further installed so as to install a defrosting water line and electric wires.

The first plate 10 may define at least a portion of a wall for a first space provided thereto. The second plate 20 may define at least a portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are thermal conduction between the first and second plates 10 and 20, heat radiation between the first and second plates 10 and 20, and gas conduction of the vacuum space 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

FIG. 3 is a view illustrating an internal configuration of the vacuum space according to various embodiments.

First, referring to FIG. 3A, the vacuum space 50 may be provided in a third space having a pressure different from that of each of the first and second spaces, preferably, a vacuum state, thereby reducing an adiabatic loss. The third space may be provided at a temperature between the temperature of the first space and the temperature of the second space. Since the third space is provided as a space in the vacuum state, the first and second plates 10 and 20 receive a force contracting in a direction in which they approach each other due to a force corresponding to a pressure difference between the first and second spaces. Therefore, the vacuum space 50 may be deformed in a direction in which the vacuum space 50 is reduced in volume. In this case, the adiabatic loss may be caused due to an increase in amount of heat radiation, caused by the contraction of the vacuum space 50, and an increase in amount of thermal conduction, which is caused by contact between the plates 10 and 20.

The support 30 may be provided to reduce the deformation of the vacuum space 50. The support 30 includes a bar 31. The bar 31 may extend in a substantially vertical direction with respect to the plates to support a distance between the first plate and the second plate. A support plate 35 may be additionally provided on at least any one end of the bar 31. The support plate 35 may connect at least two or more bars 31 to each other to extend in a horizontal direction with respect to the first and second plates 10 and 20. The support plate 35 may be provided in a plate shape or may be provided in a lattice shape so that an area of the support plate contacting the first or second plate 10 or 20 decreases, thereby reducing heat transfer. The bars 31 and the support plate 35 are fixed to each other at at least a portion so as to be inserted together between the first and second plates 10 and 20. The support plate 35 contacts at least one of the first and second plates 10 and 20, thereby preventing the deformation of the first and second plates 10 and 20. In addition, based on the extension direction of the bars 31, a total sectional area of the support plate 35 is provided to be greater than that of the bars 31, so that heat transferred through the bars 31 may be diffused through the support plate 35.

The support 30 may be made of a resin selected from PC, glass fiber PC, low outgassing PC, PPS, and LCP to obtain high compressive strength, a low outgassing and water absorption rate, low thermal conductivity, high compressive strength at a high temperature, and superior processability.

A radiation resistance sheet 32 for reducing heat radiation between the first and second plates 10 and 20 through the vacuum space 50 will be described. The first and second plates 10 and 20 may be made of a stainless material capable of preventing corrosion and providing a sufficient strength. Since the stainless material has a relatively high emissivity of 0.16, a large amount of radiation heat may be transferred. In addition, the support 30 made of the resin has a lower emissivity than the plates, and is not entirely provided to inner surfaces of the first and second plates 10 and 20. Thus, the support 30 does not have great influence on the radiation heat. Therefore, the radiation resistance sheet 32 may be provided in a plate shape over a majority of the area of the vacuum space 50 so as to concentrate on reduction of radiation heat transferred between the first and second plates 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet, at least two radiation resistance sheets 32 may be provided at a certain distance so as not to contact each other. Also, at least one radiation resistance sheet may be provided in a state of contacting the inner surface of the first or second plate 10 or 20.

Referring back FIG. 3b, the distance between the plates is maintained by the support 30, and a porous material 33 may be filled in the vacuum space 50. The porous material 33 may have a higher emissivity than that of the stainless material of the first and second plates 10 and 20. However, since the porous material 33 is filled in the vacuum space 50, the porous material 33 has a high efficiency for resisting the radiation heat transfer.

In this embodiment, the vacuum adiabatic body may be fabricated without the radiation resistance sheet 32.

Referring to FIG. 3c, the support 30 for maintaining the vacuum space 50 may not be provided. A porous material 333 may be provided to be surrounded by a film 34 instead of the support 30. Here, the porous material 33 may be provided in a state of being compressed so that the gap of the vacuum space is maintained. The film 34 made of, for example, a PE material may be provided in a state in which a hole is punched in the film 34.

In this embodiment, the vacuum adiabatic body may be fabricated without the support 30. That is to say, the porous material 33 may perform the function of the radiation resistance sheet 32 and the function of the support 30 together.

FIG. 4 is a view illustrating the conductive resistance sheet and the peripheral portion thereof according to various embodiments. A structure of each of the conductive resistance sheets are briefly illustrated in FIG. 2, but will be understood in detail with reference to the drawings.

First, a conductive resistance sheet proposed in FIG. 4a may be applied to the main body-side vacuum adiabatic body. Specifically, the first and second plates 10 and 20 are to be sealed so as to vacuum the inside of the vacuum adiabatic body. In this case, since the two plates have different temperatures from each other, heat transfer may occur between the two plates. A conductive resistance sheet 60 is provided to prevent thermal conduction between different two kinds of plates.

The conductive resistance sheet 60 may be provided with the seal 61 at which both ends of the conductive resistance sheet 60 are sealed to define at least a portion of the wall for the third space and maintain the vacuum state. The conductive resistance sheet 60 may be provided as a thin foil in unit of micrometer so as to reduce the amount of heat conducted along the wall for the third space. The seals 610 may be provided as a weld. That is, the conductive resistance sheet 60 and the plates 10 and 20 may be fused to each other. To cause a fusing operation between the conductive resistance sheet 60 and the plates 10 and 20, the conductive resistance sheet 60 and the plates 10 and 20 may be made of the same material, and a stainless material may be used as the material. The seal 610 may not be limited to the weld and may be provided through a process such as cocking. The conductive resistance sheet 60 may be provided in a curved shape. Thus, a thermal conduction distance of the conductive resistance sheet 60 is provided longer than a linear distance of each of the plates so that an amount of thermal conduction is further reduced.

A change in temperature occurs along the conductive resistance sheet 60. Therefore, to block the heat transfer to the outside of the conductive resistance sheet 60, a shield 62 may be provided at the outside of the conductive resistance sheet 60 so that an adiabatic operation occurs. In other words, in case of the refrigerator, the second plate 20 has a high temperature, and the first plate 10 has a low temperature. In addition, thermal conduction from high temperature to low temperature occurs in the conductive resistance sheet 60, and thus the temperature of the conductive resistance sheet 60 is suddenly changed. Therefore, when the conductive resistance sheet 60 is opened with respect to the outside thereof, the heat transfer through the opened place may seriously occur. To reduce the heat loss, the shield 62 is provided outside the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shield 62 may be provided as a porous material contacting an outer surface of the conductive resistance sheet 60. The shield 62 may be provided as an adiabatic structure, e.g., a separate gasket, which is placed at the outside of the conductive resistance sheet 60. The shield 62 may be provided as a portion of the vacuum adiabatic body, which is provided at a position facing a corresponding conductive resistance sheet 60 when the main body-side vacuum adiabatic body is closed with respect to the door-side vacuum adiabatic body. To reduce the heat loss even when the main body and the door are opened, the shield 62 may be provided as a porous material or a separate adiabatic structure.

Here, the inner surface of the conductive resistance sheet 60 means a surface in which the conductive resistance sheet 60 faces the vacuum space. The outer surface of the conductive resistance sheet 60 may mean a surface that does not face the vacuum space. The definitions of the outer surface and the inner surface may be applied to other portion forming the vacuum space.

A conductive resistance sheet proposed in FIG. 4b may be applied to the door-side vacuum adiabatic body. In FIG. 4b, portions different from those of FIG. 4a are described in detail, and the same description is applied to portions identical to those of FIG. 4a. A side frame 70 is further provided outside the conductive resistance sheet 60. A component for the sealing between the door and the main body, an exhaust port necessary for an exhaust process, a getter port for vacuum maintenance, and the like may be placed on the side frame 70. This is because the mounting of components is convenient in the main body-side vacuum adiabatic body, but the mounting positions of components are limited in the door-side vacuum adiabatic body.

In the door-side vacuum adiabatic body, it is difficult to place the conductive resistance sheet 60 on a front end of the vacuum space, i.e., an edge side surface of the vacuum space. This is because, unlike the main body, a corner edge of the door is exposed to the outside. In more detail, if the conductive resistance sheet 60 is placed on the front end of the vacuum space, the corner edge of the door is exposed to the outside, and hence there is a disadvantage in that a separate adiabatic portion has to be configured so as to thermally insulate the conductive resistance sheet 60.

A conductive resistance sheet proposed in FIG. 4c may be installed in the pipeline passing through the vacuum space. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path may be lengthened, and deformation caused by a pressure difference may be prevented. In addition, a separate shield may be provided to improve the adiabatic performance of the conductive resistance sheet.

A heat transfer path between the first and second plates 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, support conduction heat ② conducted along the support 30 provided inside the vacuum adiabatic body, gas conduction heat ③ conducted through an internal gas in the vacuum space, and radiation transfer heat ④ transferred through the vacuum space.

The transfer heat may be changed depending on various depending on various design dimensions. For example, the support may be changed so that the first and second plates 10 and 20 may endure a vacuum pressure without being deformed, the vacuum pressure may be changed, the distance between the plates may be changed, and the length of the conductive resistance sheet may be changed. The transfer heat may be changed depending on a difference in temperature between the spaces (the first and second spaces) respectively provided by the plates. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the support conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to the heat transfer distribution, effective heat transfer coefficients (eK: effective K) (W/mK) of the surface conduction heat ①, the support conduction heat ②, the gas conduction heat ③, and the radiation transfer heat ④ may have an order of Math Equation 1 when comparing the transfer heat ①, ②, ③, and ④.

$$eK_{solid\ conduction\ heat} > eK_{radiation\ conduction\ heat} > eK_{gas\ conduction\ heat}$$ [Equation 1]

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference $\Delta T$ between an entrance and an exit of the conductive resistance sheet 60 or 63, a sectional area A of the conductive resistance sheet, a length L of the conductive resistance sheet, and a thermal conductivity (k) of the conductive resistance sheet (the thermal conductivity of the conductive resistance sheet is a material property of a material and may be obtained in advance). For the support conduction heat, a conductive calorific value may be obtained through a temperature difference $\Delta T$ between an entrance and an exit of the support 30, a sectional area A of the support, a length L of the support, and a thermal conductivity (k) of the support. Here, the thermal conductivity of the support may be a material property of a material and may be obtained in advance. The sum of the gas conduction heat ③, and the radiation transfer heat ④ may be obtained by subtracting the surface conduction heat and the support conduction heat from the heat transfer amount of the entire vacuum adiabatic body. A ratio of the gas conduction heat ③, and the radiation transfer heat ③ may be obtained by evaluating radiation transfer heat when no gas conduction heat exists by remarkably lowering a vacuum degree of the vacuum space 50.

When a porous material is provided inside the vacuum space 50, porous material conduction heat ⑤ may be a sum of the support conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be provided to be less than 0.5° C. Also, a temperature difference $\Delta T_2$ between the geometric center formed by the adjacent bars 31 and an edge of the vacuum adiabatic body may be provided to be less than 0.5° C. In the second plate 20, a temperature difference between an average temperature of the second plate and a temperature at a point at which a heat transfer path passing through the conductive resistance sheet 60 or 63 meets the second plate may be the largest. For example, when the second space is a region hotter than the first space, the temperature at the point at which the heat transfer path passing through the conductive resistance sheet meets the second plate becomes lowest. Similarly, when the second space is a region colder than the first space, the temperature at the point at which the heat transfer path passing through the conductive resistance sheet meets the second plate becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. For this, a temperature variation of the conductive resistance sheet may be controlled to be larger than that of the plate.

Physical characteristics of the components constituting the vacuum adiabatic body will be described. In the vacuum adiabatic body, force due to a vacuum pressure is applied to all of the components. Therefore, a material having a strength ($N/m^2$) of a certain level may be used.

Under such circumferences, the plates 10 and 20 and the side frame 70 may be made of a material having sufficient strength with which the plates 10 and 20 are not damaged by even the vacuum pressure. For example, when the number of bars 31 decreases to limit the support conduction heat, the deformation of each of the plates occurs due to the vacuum pressure, which may bad influence on an outer appearance of the refrigerator. The radiation resistance sheet 32 may be made of a material that has a low emissivity and may be easily subjected to thin film processing. Also, the radiation resistance sheet 32 has to ensure strength enough without being deformed by an external impact. The support 30 is provided to strength that is enough to support the force by the vacuum pressure and endure the external impact, and is to have processability. The conductive resistance sheet 60 may be made of a material that has a thin plate shape and may endure the vacuum pressure.

In an embodiment, the plate, the side frame, and the conductive resistance sheet may be made of stainless materials having the same strength. The radiation resistance sheet may be made of aluminum having weaker strength than that of each of the stainless materials. The support may be made of a resin having weaker strength than that of the aluminum.

Unlike the strength from the point of view of the materials, an analysis from the point of view of stiffness is required. The stiffness (N/m) may be a property that is not be easily deformed. Thus, although the same material is used, its stiffness may vary depending on its shape. The conductive resistance sheets 60 or 63 may be made of a material having strength, but the stiffness of the material may be low so as to increase in heat resistance and minimize the radiation heat as the conductive resistance sheet is uniformly spread without any roughness when the vacuum pressure is applied. The radiation resistance sheet 32 requires stiffness having a certain level so as not to contact another component due to deformation. Particularly, an edge of the radiation resistance sheet may generate the conduction heat due to drooping caused by the self-load of the radiation resistance sheet. Therefore, the stiffness having the certain level is required. The support 30 requires a stiffness enough to endure compressive stress from the plate and the external impact.

In an embodiment, the plate and the side frame may have the highest stiffness so as to prevent the deformation caused by the vacuum pressure. The support, particularly, the bar may have the second highest stiffness. The radiation resistance sheet may have stiffness that is lower than that of the support but higher than that of the conductive resistance sheet. Lastly, the conductive resistance sheet may be made of a material that is easily deformed by the vacuum pressure and has the lowest stiffness.

Even when the porous material 33 is filled in the vacuum space 50, the conductive resistance sheet may have the lowest stiffness, and each of the plate and the side frame may have the highest stiffness.

Hereinafter, the vacuum pressure may be determined depending on internal states of the vacuum adiabatic body. As already described above, a vacuum pressure is to be maintained inside the vacuum adiabatic body so as to reduce heat transfer. Here, it will be easily expected that the vacuum pressure is maintained as low as possible so as to reduce the heat transfer.

The vacuum space may resist to heat transfer by only the support 30. Here, a porous material 33 may be filled with the support inside the vacuum space 50 to resist to the heat transfer. The heat transfer to the porous material may resist without applying the support.

The case in which only the support is applied will be described.

FIG. 5 is a graph illustrating a variation in adiabatic performance and a variation in gas conductivity according to the vacuum pressure by applying a simulation.

Referring to FIG. 5, it may be seen that, as the vacuum pressure decreases, i.e., as the vacuum degree increases, a heat load in the case of only the main body (Graph 1) or in the case in which the main body and the door are combined together (Graph 2) decreases as compared to that in the case of the typical product formed by foaming polyurethane, thereby improving the adiabatic performance. However, it may be seen that the degree of improvement of the adiabatic performance is gradually lowered. Also, it may be seen that, as the vacuum pressure decreases, the gas conductivity (Graph 3) decreases. However, it may be seen that, although the vacuum pressure decreases, a ratio at which the adiabatic performance and the gas conductivity are improved is gradually lowered. Therefore, it is preferable that the vacuum pressure decreases as low as possible. However, it takes long time to obtain an excessive vacuum pressure, and much cost is consumed due to an excessive use of the getter. In the embodiment, an optimal vacuum pressure is proposed from the above-described point of view.

FIG. 6 is a graph illustrating results obtained by observing a time and a pressure in a process of exhausting the inside of the vacuum adiabatic body when the support is used.

Referring to FIG. 6, to create the vacuum space 50 to be in the vacuum state, a gas in the vacuum space 50 is exhausted by a vacuum pump while evaporating a latent gas remaining in the components of the vacuum space 50 through baking. However, if the vacuum pressure reaches a certain level or more, there exists a point at which the level of the vacuum pressure does not increase any more ($\Delta t_1$). Thereafter, the getter is activated by disconnecting the vacuum space 50 from the vacuum pump and applying heat to the vacuum space 50 ($\Delta t_2$). If the getter is activated, the pressure in the vacuum space 50 decreases for a certain period of time, but then normalized to maintain a vacuum pressure having a certain level. The vacuum pressure that maintains the certain level after the activation of the getter is approximately $1.8 \times 10^{-6}$ Torr.

In the embodiment, a point at which the vacuum pressure does not substantially decrease any more even though the gas is exhausted by operating the vacuum pump is set to the lowest limit of the vacuum pressure used in the vacuum adiabatic body, thereby setting the minimum internal pressure of the vacuum space 50 to $1.8 \times 10^{-6}$ Torr.

FIG. 7 is a graph illustrating results obtained by comparing the vacuum pressure with gas conductivity.

Referring to FIG. 7, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three sizes of 2.76 mm, 6.5 mm, and 12.5 mm. The gap in the vacuum space 50 is defined as follows. When the radiation resistance sheet 32 exists inside vacuum space 50, the gap is a distance between the radiation resistance sheet 32 and the plate adjacent thereto. When the radiation resistance sheet 32 does not exist inside vacuum space 50, the gap is a distance between the first and second plates.

It was seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it was seen that the point at which reduction in adiabatic effect caused by the gas conduction heat is saturated even though the vacuum pressure decreases is a point at which the vacuum pressure is approximately $4.5 \cdot 10^{-3}$ Torr. The vacuum pressure of $4.5 \times 10^{-3}$ Torr may be defined as the point at which the reduction in adiabatic effect caused by the gas conduction heat is saturated. Also, when the effective heat transfer coefficient is 0.1 W/mK, the vacuum pressure is $1.2 \times 10^{-2}$ Torr.

When the vacuum space 50 is not provided with the support but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by the gas conduction heat is saturated is approximately $4.7 \times 10^{-2}$ Torr.

Also, the pressure where the reduction in adiabatic effect caused by gas conduction heat reaches the typical effective heat transfer coefficient of 0.0196 W/mK is 730 Torr.

When the support and the porous material are provided together in the vacuum space, a vacuum pressure may be created and used, which is middle between the vacuum pressure when only the support is used and the vacuum pressure when only the porous material is used. When only the porous material is used, the lowest vacuum pressure may be used.

The vacuum adiabatic body includes a first plate defining at least a portion of a wall for the first space and a second plate defining at least a portion of a wall for the second space and having a temperature different from the first space. The first plate may include a plurality of layers. The second plate may include a plurality of layers The vacuum adiabatic body may further include a seal configured to seal the first plate and the second plate so as to provide a third space that is in a vacuum state and has a temperature between a temperature of the first space and a temperature of the second space.

When one of the first plate and the second plate is disposed in an inner space of the third space, the plate may be represented as an inner plate. When the other one of the first plate and the second plate is disposed in an outer space of the third space, the plate may be represented as an outer plate. For example, the inner space of the third space may be a storage room of the refrigerator. The outer space of the third space may be an outer space of the refrigerator.

The vacuum adiabatic body may further include a support that maintains the third space.

The vacuum adiabatic body may further include a conductive resistance sheet connecting the first plate to the second plate to reduce an amount of heat transferred between the first plate and the second plate.

At least a portion of the conductive resistance sheet may be disposed to face the third space. The conductive resistance sheet may be disposed between an edge of the first plate and an edge of the second plate. The conductive resistance sheet may be disposed between a surface on which the first plate faces the first space and a surface on which the second plate faces the second space. The conductive resistance sheet may be disposed between a side surface of the first plate and a side surface of the second plate.

At least a portion of the conductive resistance sheet may extend in a direction that is substantially the same as the direction in which the first plate extends.

A thickness of the conductive resistance sheet may be thinner than at least one of the first plate or the second plate. The more the conductive resistance sheet decreases in thickness, the more heat transfer may decrease between the first plate and the second plate.

The more the conductive resistance sheet decreases in thickness, the more it may be difficult to couple the conductive resistance sheet between the first plate and the second plate.

One end of the conductive resistance sheet may be disposed to overlap at least a portion of the first plate. This is to provide a space for coupling one end of the conductive resistance sheet to the first plate. Here, the coupling method may include welding.

The other end of the conductive resistance sheet may be arranged to overlap at least a portion of the second plate. This is to provide a space for coupling the other end of the conductive resistance sheet to the second plate. Here, the coupling method may include welding.

As another embodiment of replacing the conductive resistance sheet, the conductive resistance sheet may be deleted, and one of the first plate and the second plate may be thinner than the other. In this case, any thickness may be greater than that of the conductive resistance sheet. In this case, any length may be greater than that of the conductive resistance sheet. With this configuration, it is possible to reduce the increase in heat transfer by deleting the conductive resistance sheet. Also, this configuration may reduce difficulty in coupling the first plate to the second plate.

At least a portion of the first plate and at least a portion of the second plate may be disposed to overlap each other. This is to provide a space for coupling the first plate to the second plate. An additional cover may be disposed on any one of the first plate and the second plate, which has a thin thickness. This is to protect the thin plate.

The vacuum adiabatic body may further include an exhaust port for discharging a gas in the vacuum space.

Hereinafter, according to an embodiment, as a product that may be widely used in adiabatic products such as refrigerators, a vacuum adiabatic module to which the technology of the vacuum adiabatic body is applied will be described.

The vacuum adiabatic module is a modularized component to enable high adiabatic performance due to a low vacuum pressure to be used for many adiabatic products. The vacuum adiabatic module may be applied as one component of the adiabatic product such as the vacuum adiabatic body and the refrigerator. The vacuum adiabatic body and the vacuum adiabatic module may be used similarly, but the vacuum adiabatic module may be more versatile than the vacuum adiabatic body and be different from the vacuum adiabatic body in that the vacuum adiabatic effect is achieved only by being mounted in various other applications.

In the description of the following embodiments, it is illustrated that the refrigerator is provided using the vacuum adiabatic module. The application of the vacuum adiabatic module is not limited to the refrigerator, but may be applied to various vacuum adiabatic products. In the following description, in the following description, a description with respect to the preferred place of use may be added as the name of the door and the main body, but this is for understanding the contents and should not be interpreted limitedly in the name. Also, the expression such as first and second may be used to indicate meanings that are distinguished from each other rather than to indicate order or importance.

In the description of the following embodiments, the vacuum adiabatic module may be provided as a wall portion having the vacuum space therein as a modularized portion as a whole, but is not limited thereto, and additional components or additional processing may be performed on the edge or the like. However, since the vacuum adiabatic body is a portion that is characterized by having a two-dimensional extension structure to provide an adiabatic wall, a cross-sectional view will be mainly described, and a characteristic portion in the cross-section will be described more intensively.

FIG. 8 is a cross-sectional view of the first door vacuum adiabatic module.

Referring to FIG. 8, the first door vacuum adiabatic module 100 is a modularized vacuum adiabatic body that is capable of being applied to the door of the refrigerator.

Even if there is no special description, the portions such as the plates 10 and 20, the support 30, the radiation resistance sheet 32, the bar 31, the support plate 35, and the conductive resistance sheet 60, which are applied to the above-described vacuum adiabatic body, may be applied to the first door vacuum adiabatic module 100. This is also applied to other vacuum adiabatic modules. However, for convenience of explanation, different numbers are assigned for more clear description. For example, the first plate may correspond to the inner cover, and the second plate may correspond to the outer cover. A number of other components such as an exhaust port for applying a vacuum pressure may be included, but may be omitted from the description.

The first door vacuum adiabatic module 100 is provided with an inner cover 101 and an outer cover 201, which are respectively disposed to correspond to an inner space and an outer space of the adiabatic space. Inner spaces of the inner and outer covers 101 and 201 may provide a vacuum space having a vacuum pressure as described in the vacuum adiabatic body. A support 30 may be installed to support the inside of the vacuum space, and the radiation resistance sheet may be provided to resist radiation heat transfer.

An end of the outer cover 201 may have a bent portion 2011 bent toward the inner cover 101. The bent portion 2011 may further have a side surface 2012 extending inward. The outer cover 201 may have an outer surface 2013 corresponding to the outer space, a side surface 2012 covering a side surface, and a bent portion 2011 at which the side surface and the outer surface are connected to each other and then bent as a whole.

The outer surface 2013, the bent portion 2011, and the side surface 2012 may be provided as a single plate. Here, the single plate may be processed by a drawing or the like so as to be integrated or may be integrated through an integration method such as welding.

A conductive resistance sheet 60 may be provided between an end of the side surface 2012 of the outer cover 201 and an end of the inner cover 101. Both ends of the conductive resistance sheet 60 may be sealed and integrated to the covers 101 and 201 by a coupling method such as the welding. The conductive resistance sheet 60 is not shown, but may be provided in a shape that is recessed by a predetermined depth toward the vacuum space to reduce conduction heat.

Each of the outer cover 201 and the inner cover 101 may be made of a metal to have sufficient strength.

The outer cover 201 is provided to be larger than the inner cover 101. According to this configuration, when the vacuum adiabatic module provides an adiabatic product having an accommodation space therein, the vacuum adiabatic module may provide convenience of coupling or protect components therein. The outer cover 210 may have a flat end further extending outward from the inner cover 101. Accordingly, the extending end may be bent and used as a coupling portion, and the side surface may be provided to create the vacuum space.

A first reinforcement frame 102 may be provided on an inner surface of an edge at which the outer cover 201 including the bent portion 2011 is bent. The reinforcement frame 102 may be provided to reduce shape deformation of the edge of the first door vacuum adiabatic module 100, which is caused by force caused by a difference between an atmospheric pressure and an air pressure of the vacuum space. The reinforcement frame may compensate distortion of the force due to an uneven difference in external force, which is caused by the conductive resistance sheet 60.

The first reinforcement frame 102 may be provided to reinforce strength so as to prevent deformation, such as twisting or bending, of the entire shape of the first door vacuum adiabatic module 100. Although not shown, the first reinforcement frame 102 may be provided as a structure having a closed curve that is surrounded by an edge of the first door vacuum adiabatic module 100.

The first door vacuum insulated module 100 is used for the door of the refrigerator and may be provided substantially entirely, except for a portion for thermal insulation or sealing that is not avoided on the front side of the door. As a result, after fixing the first door vacuum adiabatic module 100 to a predetermined frame, the door may be completed only by installing an additional component such as a basket.

The first door vacuum insulated module 100 may have a shape that is changed due to imbalance of a pressure applied to the conductive resistance sheet 60 and long-term use. A second embodiment for improving this limitation will be described as the second door vacuum adiabatic module 110.

In the description of the second door vacuum insulated module 110, the description of the first door vacuum insulated module 100 may be applied as it is without a specific mention. In addition, the contents applied from the descriptions of the first door vacuum adiabatic module 100 may be applied as it is to the body vacuum adiabatic module.

FIG. 9 is a cross-sectional view illustrating a corner of the second door vacuum adiabatic module.

Referring to FIG. 9, the side surface 2012 has a length that is significantly shorter than that of the first door vacuum adiabatic module 100 in the second door vacuum adiabatic module 110. The conductive resistance sheet 60 may be placed on the remaining side surface of the second door vacuum adiabatic module 110. The conductive resistance sheet 60 may be installed on the side surface of the second door vacuum adiabatic module 110. Here, the side surface is a concept that is distinguished from the positions of the inner surface and the outer surface of the second door vacuum adiabatic module and may be an accurate concept that distinguishes the position of the force applied to the second door vacuum adiabatic module 110 by the pressure difference between the atmospheric pressure and the vacuum space.

As a result, the difference in pressure applied to the edge of the door vacuum adiabatic module in the vertical direction may be reduced, and the uneven force may be dispersed. As a result, deformation of the edge may be reduced.

As the installation position of the conductive resistance sheet 60 moves to the outside, that is, the edge, the shape change of the edge of the second door vacuum adiabatic module 110 may be reduced. However, an adiabatic material may be placed to a predetermined thickness between the conductive resistance sheet 60 and the external space in which a large temperature difference occurs. The limitation that the entire planar area of the door in which the second door adiabatic module 110 is installed increases may occur later.

The position of the conductive resistance sheet 60 may be determined in consideration of two aspects, i.e., shape deformation and an overall size of the door. In the drawing, the concept that the position of the conductive resistance sheet 60 moves to the outside is indicated by an arrow.

A portion made of the same material as the outer cover 201 may be integrated with the outer cover 201 on a portion at which a lower portion of the conductive resistance sheet 60 and the outer cover 201 are connected to each other to provide a portion of the outer cover 201.

Supports 301 and 302 having a height different from that of the bar 31 are installed inside and outside by using the conductive resistance sheet 60 as a boundary to cause no limitation in forming the vacuum pressure in the vacuum space.

The first door vacuum adiabatic module and the second door vacuum adiabatic module may be applied as portions for thermally insulating the door of the refrigerator. A difference between the first and second door vacuum adiabatic modules will be described in more detail later with reference to FIGS. 13 to 15.

Hereinafter, the vacuum adiabatic module that is capable of being applied to the main body will be described. In the descriptions of the door vacuum adiabatic module, the same description that is applied to the main body vacuum adiabatic module will be applied as it is.

FIG. 10 is a cross-sectional view of the first main body vacuum adiabatic module.

Referring to FIG. 10, the first body vacuum adiabatic module 120 includes an outer cover 121 corresponding to an outer space, an inner cover 122 corresponding to an inner space, a conductive resistance sheet 123 that provides the inside of the inner cover 122 and the outer cover 121 as a vacuum space, and a support that is capable of maintaining a shape of the vacuum space.

The outer cover 121 further extends to the outside of the vacuum space to provide a coupling edge 124. The first body vacuum adiabatic module 120 may have a two-dimensional planar structure and may be provided in a square shape. The coupling edge may extend by a predetermined distance outward from all surfaces of the rectangle when compared to other portions.

The coupling edge 124 may be a portion for allowing the first body vacuum adiabatic module 120 to be coupled to the other portion and be illustrated in a planar shape in the drawing, but may be provided in a bent shape or a curved shape.

The coupling edge 124 may be equally provided at all edges or may not be differently provided at all edges. For example, one edge of the rectangular edges may be provided in a straight shape, and the other edge may be provided in a curved shape. As another example, one edge may be provided long, and the other edge may be provided short. The differences in this configuration may vary depending on the type of the adiabatic product to which the first main body vacuum adiabatic action is employed and the position to which the first main vacuum adiabatic action is applied.

In order to be able to correspond to the outer cover 121 having the coupling edge 124, the conductive resistance sheet 123 may be bent by a predetermined length at a portion that is in contact with the inner surface of the outer cover 121. Due to this structure, the conductive resistance sheet 123 may be sealed with the outer cover 121 and the inner cover 122 through a method such as welding.

FIG. 11 is a cross-sectional view of the second main body vacuum adiabatic module. The description of the second main body vacuum adiabatic module will be described to be focused on a difference from the first main body vacuum adiabatic module.

Referring to FIG. 11, thin plate-like portions made of the same material as the conductive resistance sheet may be disposed at a place at which the inner cover 122 and the conductive resistance sheet 60 are disposed in the first body vacuum adiabatic module 120. In other words, in the second body vacuum adiabatic module 130, the inner cover 132 may serve as a conductive resistance sheet at a longer distance.

Even if the inner cover is provided as a thin plate-like portion, there is no limitation in the role of an adiabatic portion using the vacuum space because the support 30 is disposed between the outer cover 131 and the inner cover 132.

Since the outer cover 131 is provided as a thick plate-like portion, there is no limitation in the role of a module that is capable of maintaining the shape of the second body vacuum adiabatic module 130.

The coupling edge 134 may be provided in the same manner as the first body vacuum adiabatic module 120, and its role may also be equally applied.

FIG. 12 is a cross-sectional view of the third main body vacuum adiabatic module. The description of the third main body vacuum adiabatic module will be described to be focused on a difference from the first and second main body vacuum adiabatic modules.

Referring to FIG. 12, the third body vacuum adiabatic module 130 includes an outer cover 131 corresponding to an outer space, an inner cover 132 corresponding to an inner space and a support 30 that provides the inside of the inner cover 132 and the outer cover 131 as a vacuum space.

Each of the inner cover 132 and the outer cover 131 may be made of a nonmetal such as a resin, and a PC or PPS having a small amount of outgassing may be used as the type of the resin. A thermal conductive resistance coating layer may be disposed on a surface of each of the inner cover 132 and the outer cover 131 to minimize thermal conduction.

The inner cover and the outer cover may be fabricated as separate components. In a state in which the support 30 is inserted into the inner cover and the outer cover, the inner cover and the outer cover may be sealed by an adhesive. An adhesion surfaces of the inner cover 132 and the outer cover 131 may have predetermined areas to prevent external air from being introduced, and an epoxy-based adhesive that has little outgassing, high strength, and excellent strength against high-temperature heat may be used as the adhesive.

The coupling edge 144 may be fabricated while the module is molded using a resin in a desired shape.

The body vacuum adiabatic module described above is provided on a wall surface that provides the main body of the refrigerator and may be conveniently used in the fabrication of the refrigerator. The fabricating of the main body using the main body vacuum adiabatic module will be described later with reference to FIGS. 18 to 23.

Hereinafter, differences between the first and second door vacuum adiabatic modules will be described in more detail based on a difference in force due to a pressure.

FIG. 13 is a view for explaining a pressure of the first door vacuum adiabatic module.

Referring to FIG. 13, the vacuum space of the first door vacuum adiabatic module 100 has a pressure that is significantly lower than atmospheric pressure. Therefore, contraction force according to the atmospheric pressure is applied to the cover 101, 201 and the conductive resistance sheet 60. The contraction force may act as vertical force on the surfaces of the cover and the conductive resistance sheet and may be force that contracts the entirety of the first door vacuum adiabatic module 100.

Unlike the covers 101 and 201, the conductive resistance sheet 60 is a thin plate and has weak strength. The thin plate may be easily deformed and may not be maintained in its original shape on its own. In addition, the thin film is not supported by the support 30 to resist to the conduction. As a result, the portion on which the conductive resistance sheet is disposed does not function as the frame that resists to the deformation due to the contraction force applied to the first door vacuum insulated module 100.

In this state, the place at which strain force generated in the first door vacuum adiabatic module 100 is greatest is a point that is referred to as "P". Thus, a moment corresponding to the contraction force applied to the side surface 2012 of the outer cover 201 may be concentrated at the point "P". The point "P" may be a point at which the bar 31 of the support 30 is finally supported. Thus, the moment by the side surface 2012 may be concentrated to the pint "P".

Due to the concentration of the moment, the edge of the first door vacuum adiabatic module 100 may ascend upward based on the drawing.

FIGS. 14 and 15 are views illustrating results obtained by simulating deformation of the first and second door vacuum adiabatic modules.

Referring to FIG. 14, it is seen that the outer cover 201 is significantly deformed by using the point "P" as a starting point of the deformation, and its end ascends by about 9.2 mm.

On the contrary, referring to FIG. 15, it is seen that the end of the outer cover 302 ascends by about 1.2 mm in the second door vacuum adiabatic module 110.

As illustrated in FIG. 15, the small increase in ascending amount in the second door vacuum adiabatic module 110 is mainly due to the installation of the conductive resistance sheet 60 in a direction parallel to the side surface 2012.

More specifically, this is done because a load according to the atmospheric pressure applied to the side surface 2012 is absorbed to the deformation of the conductive resistance sheet 60 as much as possible and then is dispersed to the upper and lower portions of the conductive resistance sheet 60.

However, when the conductive resistance sheet 60 covers all the side surfaces 2012, the thick adiabatic portion may be required to thermally insulate the outside of the conductive resistance sheet, and the size of the door may be excessively large. This limitation may not be ignored because of dew occurring near the conductive sheet having a large temperature difference.

In order to solve this limitation, in the second door vacuum adiabatic module, some of the side surfaces 2012 may be covered by the outer cover 201, and the inside thereof may be maintained by the second support 302.

In this case, the outside of the conductive resistance sheet may be thermally insulated by a foam adiabatic material so that the size of the door does not increase. Also, since the moment generated in the side surface provided by the outer cover 201 is dispersed and applied to the entire supports 301 and 302, an amount of deformation may be reduced. As a result, both the purpose of reducing the dew condensation and the limitation of reducing the size of the door may be achieved.

In the case of the second door vacuum adiabatic module, the limitation of how to position the conductive resistance sheet 60 by moving to a certain position may be determined according to a degree of solving the two limitations of the dew condensation and the door size.

Hereinafter, the door of the refrigerator to which the door vacuum adiabatic module according to an embodiment is applied will be described. In the description of an embodiment, the first door vacuum adiabatic module is illustrated, but it is natural that the second door vacuum adiabatic module may be applied.

FIG. 16 is an exploded perspective view of the door to which the door vacuum adiabatic module is applied according to an embodiment, and FIG. 17 is a cross-sectional view illustrating the edge of the door.

Referring to FIGS. 16 and 17, the outer cover 201, the first reinforcement frame 102, the support 30, the conductive resistance sheet 60, and the inner cover 101, which constitute the first door vacuum adiabatic module 100, are provided. The first door vacuum adiabatic module 100 is separated, but may be fabricated and supplied at a separate fabricating site from an assembly line of the door.

The inner cover 101 may be further provided with a second reinforcement frame 103 having at least two surfaces that are inclined with respect to each other. The second reinforcement frame 103 may reinforce overall strength of the first door vacuum adiabatic module 100 and perform a role of coupling an inner panel 152 constituting the door to the first door vacuum adiabatic module 100.

An outer panel 151 may be further provided in front of the first door vacuum adiabatic module 100. The outer panel 151 may be fixed to the outer cover 201 by a method such as adhesion. Even if there is a curve by the support 30 on a surface of the outer cover 201 by the outer panel 151, the curve may not be observed from the outside.

The outer panel 151 and the inner panel 152 may be coupled to each other. One end of the inner panel 152 may be coupled to the outer panel 151, and the other end may be coupled to the second reinforcement frame 103. The second reinforcement frame 103 may be coupled to the inner panel 152 while being coupled to the inner cover 101. The inner panel 152 may be made of a resin, and the outer panel 151 may be made of a metal.

The foam portion 153 may be filled in a space defined by the inner panel 152 and the outer panel 151 to reinforce the thermal insulation of the door edge and reinforce the overall strength of the door. To prevent the outer panel 151 and the outer cover 201 from being lifted with respect to each other during the foaming of the foam portion, contact ends of the outer panel 151 and the outer cover 201 may be integrated with each other the adhesion and the welding.

A gasket 154 may be coupled to the inner panel 152 so that sealing is perfect when the door contacts the main body. It may be more preferable because the adiabatic region defined outside the conductive resistance sheet 60 increases by the gasket 154.

An upper panel 155 and a lower panel 156 may be respectively provided on upper and lower ends of the door to accurately define a filling space of the foam portion 153 together with the outer panel 151 and the inner panel 152 so that a foaming process is performed. Before the foaming process is performed, components such as wires and sensors accommodated in the inner space in which the foam portion is disposed may be preliminarily accommodated therein.

Hereinafter, the refrigerator body to which the body vacuum adiabatic module according to the embodiment is applied will be described. In the description of an embodiment, the first body vacuum adiabatic module is illustrated, but it is natural that the second body vacuum adiabatic module or the third body vacuum adiabatic module are capable of being applied. Likewise, different body vacuum adiabatic modules may be mixed with each other in a single adiabatic product.

FIG. 18 is a perspective view of a refrigerator to which the main body vacuum adiabatic module is applied according to an embodiment, FIG. 19 is a cross-sectional view illustrating the main body of the refrigerator of FIG. 18, taken along line A-A', according to an embodiment, FIGS. 20 and 21 are cross-sectional views illustrating the main body of the refrigerator of FIG. 18, taken along line A-A', according to another embodiment, and FIGS. 22 and 23 are cross-sectional views illustrating the main body of the refrigerator of FIG. 18, taken along line B-B', according to another embodiment.

Here, FIGS. 18 to 22 are views illustrating a process of fabricating the main body, FIGS. 18 to 21 are views sequentially illustrating a coupling process of the main body vacuum adiabatic module applied to a rear surface of the main body and the main body vacuum adiabatic module applied to a side surface of the main body, and FIGS. 22 and 23 are views sequentially illustrating a coupling process of the main body vacuum adiabatic module applied to a top surface of the main body and the main body vacuum adiabatic module applied to the side surface of the main body.

In the following description, the main body vacuum adiabatic module will be briefly described according to the applied position. For example, the first body vacuum adiabatic module applied to the top surface is abbreviated as a top surface vacuum adiabatic module.

Referring to FIG. 19, a rear surface vacuum adiabatic module 301 and a left surface vacuum adiabatic module 302, and a right surface vacuum adiabatic module 303 are aligned. The descriptions of the rear surface vacuum adiabatic module 301 and the left surface vacuum adiabatic module 302 may be equally applied to the descriptions of the rear surface vacuum adiabatic module 301 and the right surface vacuum adiabatic module 303.

An additional portion may be provided on the rear surface vacuum adiabatic module 301. In another aspect, the additional portion may be understood as an additional component of the rear surface vacuum adiabatic module 301.

The additional portion may further include a rear coupling edge 401 provided on the outer cover 121.

The rear coupling edge 401 may extend from the outer cover 121.

The rear coupling edge 401 may extend from a point at which the outer cover 121 and the conductive resistance sheet 123 are coupled to each other.

The rear coupling edge 401 may be provided in a direction that is substantially the same as a surface on which the outer cover 121 faces the third space. The rear coupling edge 401 may extend in a direction toward the right surface vacuum adiabatic module 303.

The rear coupling edge 401 may include a first portion 4011 and a second portion 4012.

The first portion of the rear coupling edge 401 may be connected to the outer cover 121. The second portion of the rear coupling edge 401 may be a portion extending in a direction away from the outer cover 121 from the first portion.

One end of the second portion 4012 of the rear coupling edge 401 may be connected to the first portion 4011. The other end of the second portion of the rear coupling edge 401 may be spaced a predetermined distance from the right surface vacuum adiabatic module 303.

The additional portion may further include an inner coupling frame 402 provided outside the inner cover 122.

The inner coupling frame 402 may be provided to cover an edge of the inner cover 122 or so that the inner coupling frame 402 overlaps the edge of the inner cover 122.

Such the configuration may reduce deformation of the edge of the inner cover 122 by external force.

The inner coupling frame 402 may be provided to cover an edge of the conductive resistance sheet 123 or so that the inner coupling frame 402 overlaps the conductive resistance sheet 123. Such the configuration may protect the conductive resistance sheet 123 provided in the form of a thin film from being damaged.

The inner coupling frame 402 may cover a portion at which the inner cover 122 and the conductive resistance sheet 123 are coupled to each other, or the inner coupling frame 402 may overlap a portion at which the inner cover 122 and the conductive resistance sheet 123 are coupled to each other. Such the configuration may reduce that the coupled portion between the conductive resistance sheet 123 and the inner cover 122 is damaged or separated by the external force.

A second adiabatic module may be disposed outside the conductive resistance sheet 123. The conductive resistance sheet 123 may have one surface facing the third space and the other surface facing the second adiabatic module. Such the configuration may reduce dew generated around the conductive resistance sheet 123 or reduce the damage of the conductive resistance sheet 123 by the external force. The conductive resistance sheet 123 may be disposed to contact the second adiabatic module.

The inner coupling frame 402 may be provided to overlap at least a portion of the first portion 4011 of the rear coupling edge 401. The rear surface vacuum adiabatic module 301 is strong against the external force. The reason is that a vacuum space is defined inside the rear surface vacuum adiabatic module 301, and the support is provided therein. On the other hand, the rear coupling edge 401 extending from the rear surface vacuum adiabatic module 301 may be vulnerable to the deformation against the external force. When the inner coupling frame 402 is provided to overlap at least a portion of the first portion 4011 of the rear coupling edge 401, the deformation to the external force may be reduced.

The second adiabatic module may be disposed in a space defined between the inner coupling frame 402 and the rear coupling edge 401. As described above, when the second adiabatic module is disposed in the space defined between the inner coupling frame 402 and the rear coupling edge 401, the deformation of the rear coupling edge 401 against the external force may be further reduced.

The inner coupling frame 402 may extend from the rear surface vacuum adiabatic module 301 toward the right surface vacuum adiabatic module 303. At least a portion of the inner coupling frame 402 may be provided on an outer surface of the right surface vacuum adiabatic module 303.

Separate coupling portions 441 and 442 for coupling the first and second adiabatic modules to each other may be provided. The coupling portion may be coupled to the second adiabatic module by passing through at least a portion of the inner coupling frame 402. The coupling portion may be disposed so as not to contact the conductive resistance sheet 123. The coupling portion may be disposed to be spaced a predetermined distance from the conductive resistance sheet 123. The coupling portion may be disposed at a position closer to the second adiabatic module than to the third space. The coupling portion may be disposed at a position spaced a predetermined distance from the conductive resistance sheet in the direction of the second adiabatic module. Such the configuration may reduce the damage of the conductive resistance sheet 123 in the process of coupling the coupling portion. Also, when the coupling portion contacts the conductive resistance sheet 123, the first and second coupling portions 441 and 442 provide another heat transfer path, and thus, dew may be increasingly generated around the conductive resistance sheet 123.

The coupling portion may be coupled to the second adiabatic module by passing through at least a portion of the inner coupling frame 402. The coupling portion may be coupled to the second adiabatic module by passing through at least a portion of the outer coupling frame 403 to be described later.

The inner coupling frame 402 may include a first portion 4021 and a second portion 4022. The inner coupling frame 402 may include a first portion 4021 and a second portion 4022 to surround an edge of a wall defining the first space. Such the configuration may solidify the wall defined by the first adiabatic module. This is done because a corner of the wall defining the first space may be more vulnerable to the external force.

A portion of the first portion 4021 of the inner coupling frame 402 may be in contact with the inner cover 122 of the rear surface vacuum adiabatic module 301, and another portion of the first portion of the inner coupling frame 402 may be in contact with the second adiabatic module. Such the configuration may secure the coupling of the first and second adiabatic modules.

When there are a plurality of the first adiabatic modules, the first portion 4021 of the inner coupling frame 402 may be connected to any one inner cover of the plurality of first adiabatic modules. The second portion 4022 of the inner coupling frame 402 may be configured to be connected between the other inner cover of the plurality of first adiabatic modules.

When there are a plurality of the first adiabatic modules, the first portion of the inner coupling frame 402 may be configured to contact any one of the plurality of first adiabatic modules. The second portion of the inner coupling frame 402 may be configured to contact the other inner cover of the plurality of first adiabatic modules.

The inner coupling frame 402 may be disposed outside the vacuum space so that the vacuum adiabatic modules are coupled to each other to serve to reinforce strength of the main body.

The first portion may be provided to cover the edge of the inner cover 122 of the rear surface vacuum adiabatic module 301. The first portion may be provided to overlap the edge of the inner cover 122 of the rear surface vacuum adiabatic module 301.

The first portion may be provided to cover the edge of the conductive resistance sheet 123 of the rear surface vacuum adiabatic module 301. The first portion may be provided to overlap the conductive resistance sheet 123 of the rear surface vacuum adiabatic module 301.

The first portion may be provided to cover a portion at which the inner cover 122 of the rear surface vacuum adiabatic module 301 and the conductive resistance sheet 123 of the rear surface vacuum adiabatic module 301 are coupled to each other. The first portion may be provided to overlap the portion at which the inner cover 122 of the rear surface vacuum adiabatic module 301 and the conductive resistance sheet 123 of the rear surface vacuum adiabatic module 301 are coupled to each other.

The second portion may be provided to cover the edge of the inner cover 122 of the right surface vacuum adiabatic module 303. The second portion may be provided to overlap the edge of the inner cover 122 of the right surface vacuum adiabatic module 303.

The second portion may be provided to cover the edge of the conductive resistance sheet 123 of the right surface vacuum adiabatic module 303. The second portion may be provided to overlap the conductive resistance sheet 123 of the right surface vacuum adiabatic module 303.

The second portion may be provided to cover a portion at which the inner cover 122 of the right surface vacuum adiabatic module 303 and the conductive resistance sheet 123 of the right surface vacuum adiabatic module 303 are coupled to each other. The second portion may be provided to overlap the portion at which the inner cover 122 of the right surface vacuum adiabatic module 303 and the conductive resistance sheet 123 of the right surface vacuum adiabatic module 303 are coupled to each other.

A separate coupling portion may be provided to couple the first and second adiabatic modules. The first coupling portion 441 may pass through the first portion 4021 of the inner coupling frame 402 and be coupled to the second adiabatic module. The second coupling portion 442 may pass through the second portion 4022 of the inner coupling frame 402 and be coupled to the second adiabatic module. The first and second coupling portions may be disposed so as not to contact the conductive resistance sheet 123. The first and second coupling portions may be disposed to be spaced a predetermined distance from the conductive resistance sheet 123. The first and second coupling portions may be disposed closer to the second adiabatic module than to the third space. The first and second coupling portions may be disposed to be spaced a predetermined distance from the conductive resistance sheet in the direction of the second adiabatic module.

The first adiabatic module may further include an outer coupling frame 403 provided to be connected to the rear coupling edge 401. The outer coupling frame 403 may be provided on an outer surface of the second portion of the rear coupling edge 401.

The outer coupling frame 403 may include a first portion 4031 and a second portion 4032. The outer coupling frame 403 may include a first portion and a second portion so as to surround an edge of a wall defining the second space. The outer coupling frame 403 may be disposed outside the vacuum space so that the vacuum adiabatic modules are coupled to each other to serve to reinforce strength of the main body. The outer coupling frame 403 may be disposed in an inner space defined by the rear coupling edge 401 of the rear surface vacuum adiabatic module 301 and a side surface rear end coupling edge 404.

The first portion may be provided to cover the edge of the rear coupling edge 401 of the rear surface vacuum adiabatic module 301. The first portion may be provided to overlap the edge of the rear coupling edge 401 of the rear surface vacuum adiabatic module 301.

The first portion may be provided to be spaced a predetermined distance from the conductive resistance sheet 123 of the right surface vacuum adiabatic module 303. The first portion may be provided to overlap the conductive resistance sheet 123 of the right surface vacuum adiabatic module 303.

A separate coupling portion may be provided to couple the first and second adiabatic modules. The third coupling portion 443 may be coupled to the second adiabatic module by passing through the rear coupling edge 401 of the rear surface vacuum adiabatic module 301.

The second portion may be provided to be spaced a predetermined distance from the conductive resistance sheet 123 of the right surface vacuum adiabatic module 303. The second portion may be provided to overlap the conductive resistance sheet 123 of the right surface vacuum adiabatic module 303.

The right surface vacuum adiabatic module 303 is provided with an additional portion. For example, the side surface rear end coupling edge 404 provided on the outer cover 121 may be included. A description of the portion at which the side surface rear end coupling edge 404 performs the same function as the rear coupling edge 401 will be omitted.

The additional portion may further include a rear end bending edge 405 defined a rear end of the side surface rear end coupling edge 404. The rear end bending edge 405 may be disposed to cover at least a portion of the rear coupling edge 401. The rear end bending edge 405 may be disposed to overlap the rear coupling edge 401. The rear end bending edge 405 may be coupled to the rear coupling edge 401 at the overlapping portion. The bonding method may include the welding or the adhesion. The coupling method may be a method using a separate coupling portion. As a modified example, the rear end bending edge 405 may be removed from the right surface vacuum adiabatic module 303, and the rear end bending edge may be disposed on the rear surface vacuum adiabatic module 301.

A separate coupling portion may be provided to couple the first and second adiabatic modules. The third coupling portion 443 may be coupled to the second adiabatic module by passing through the rear coupling edge 401 of the rear surface vacuum adiabatic module 301.

The third coupling portion may be coupled to the second adiabatic module by passing through the rear end bending edge 405 defining the rear end of the side surface rear end coupling edge 404.

The fourth coupling portion 444 may be coupled to the second adiabatic module by passing through the side surface rear end coupling edge 404 of the right surface vacuum adiabatic module 303.

The additional portion may further include an outer coupling frame 403 that has a predetermined distance from the rear end bending edge 405 and is coupled to the side surface rear end coupling edge 404. The description of the outer coupling frame 403 is the same as described above, and thus, the description thereof will be omitted. The coupling edges 401 and 404 do not perform a function of maintaining vacuum of the vacuum space, but a function for coupling the other component is performed.

The left surface vacuum adiabatic module 302 may move to a right side and then be inserted toward the rear surface vacuum adiabatic module 301. During the insertion, the rear coupling edge 401 may be inserted into a gap between the outer coupling frame 403 and the rear end bending edge 405. Due to the insertion, correct seating of the rear surface vacuum adiabatic module 301 and the left surface vacuum adiabatic module 302 may be set. After the seating, each of the frames 402 and 403 and the coupling edges 401, 404, and 405 may be coupled to each other. For the coupling, the method such as the welding and the adhesion may be applied. The frame 402 and 406 may achieve the purpose of coupling between the portions, the purpose of increasing in strength of the body vacuum adiabatic module, and the purpose of increasing in overall strength of the main body.

Referring to FIG. 19, a cross-sectional structure of the main body provided by the rear surface vacuum adiabatic module 301 and the left vacuum adiabatic module 302 may be seen. The foam portion 406 may be filled in a state in which an additional portion 407 such as a wiring is inserted into the space of the contact portion between the rear surface vacuum adiabatic module 301 and the left surface vacuum adiabatic module 302.

As a modification, after the second adiabatic module in which the additional portion such as the wiring is inserted is previously fabricated, the second adiabatic module may be inserted into the space of the contact portion between the rear surface vacuum adiabatic module 301 and the left vacuum adiabatic module 302.

As another modification, the second adiabatic module in which a through-hole through which the additional portion such as the wiring is inserted is defined may be fabricated in advance. The fabricated second adiabatic module may be inserted into the space of the contact portion between the rear adiabatic module 301 and the left surface vacuum adiabatic module 302. After the second adiabatic module is inserted into the space, the additional portion such as the wiring may be inserted into the through-hole. Examples of the additional portion such as the wiring include an electric wire through which electricity flows, a refrigerant pipe through which a refrigerant flows, a duct through which cool air flows, and a pipe through which water flows. To define the through-hole in the first adiabatic module, a vacuum leak may occur therein, and inconvenience of additional welding may be required to reduce the vacuum leakage.

The foam portion may be filled in a state in which a heater 408 is embedded in front ends of the left surface vacuum adiabatic module 302 and the right surface vacuum adiabatic module 303. As another modification, the second adiabatic module in which a through-hole through which the heater 408 is inserted is defined may be fabricated in advance. The heater may include a hot line or a heating element.

The second adiabatic module exemplified by the foam portion 406 not only performs thermal insulation, but also reinforces the strength of the main body and allows the gap between each vacuum adiabatic module to be completely sealed. This action may be achieved by the body vacuum adiabatic module according to the embodiment.

Referring to FIG. 20, the rear surface vacuum adiabatic module 301, the left surface vacuum adiabatic module 302, and the right surface vacuum adiabatic module 303 are aligned. The descriptions of the rear surface vacuum adiabatic module 301 and the left surface vacuum adiabatic module 302 may be equally applied to the descriptions of the rear surface vacuum adiabatic module 301 and the right surface vacuum adiabatic module 303.

The rear surface vacuum adiabatic module 301 is provided with an additional portion. For example, a rear coupling edge 401 provided on the outer cover 121 and an inner coupling frame 402 provided on the outer surface of the inner cover 122 may be included. The coupling frame may be disposed outside the vacuum space so that the vacuum adiabatic modules are coupled to each other to serve to reinforce strength of the main body.

The left surface vacuum adiabatic module 303 is provided with an additional portion. For example, a side surface rear end coupling edge 404 provided on the outer cover 121, a rear end bending edge 405 defining a rear end of the side surface rear end coupling edge 404, and an outer coupling frame 403 spaced a predetermined distance from the rear end bending edge 405 and coupled to the side surface rear end coupling edge 404 may be included.

The coupling edges 401 and 404 do not perform a function of maintaining vacuum of the vacuum space, but a function for coupling the other component is performed.

The left surface vacuum adiabatic module 302 may move to a right side and then be inserted toward the rear surface vacuum adiabatic module 301. During the insertion, the rear coupling edge 401 may be inserted into a gap between the outer coupling frame 403 and the rear end bending edge 405. Due to the insertion, correct seating of the rear surface vacuum adiabatic module 301 and the left surface vacuum adiabatic module 302 may be set. After the seating, each of the frames 402 and 403 and the coupling edges 401, 404, and 405 may be coupled to each other. For the coupling, the method such as the welding and the adhesion may be applied.

The frame 402 and 403 may achieve the purpose of coupling between the portions, the purpose of increasing in strength of the body vacuum adiabatic module, and the purpose of increasing in overall strength of the main body.

Referring to FIG. 21, a cross-sectional structure of the main body provided by the rear surface vacuum adiabatic module 301 and the left vacuum adiabatic module 302 may be seen. The foam portion 406 may be filled in a state in which an additional portion such as a wiring is inserted into the space of the contact portion between the rear surface vacuum adiabatic module 301 and the left surface vacuum adiabatic module 302.

In the modified example by the second adiabatic module replacing the foam portion, the description that is the same as described above will be omitted.

The foam portion may be filled in a state in which the hot line 408 is embedded in front ends of the left surface vacuum adiabatic module 302 and the right surface vacuum adiabatic module 303.

The foam portion 406 not only performs thermal insulation, but also reinforces the strength of the main body and allows the gap between each vacuum adiabatic module to be completely sealed. This action may be achieved by the body vacuum adiabatic module according to the embodiment.

Referring to FIG. 22, the top surface vacuum adiabatic module 304 and a left surface vacuum adiabatic module 302, and a right surface vacuum adiabatic module 303 are aligned. The descriptions of the top surface vacuum adiabatic module 304 and the left surface vacuum adiabatic module 302 may be equally applied to the descriptions of the top surface vacuum adiabatic module 304 and the right surface vacuum adiabatic module 303.

The top surface vacuum adiabatic module 304 is provided with an additional portion. For example, a top surface rear end coupling edge 411 provided on the outer cover 121, an upper end bending edge 412 defining an end of the top surface coupling edge 411 and then bent, and an outer coupling frame 403 spaced a predetermined distance from the upper end bending edge 412 and coupled to the top surface rear end coupling edge 411 may be included. In addition, an inner coupling frame 402 provided on the inner cover 122 may be included. The inner coupling frame 402 may be provided to the left surface vacuum adiabatic module 303.

The left surface vacuum adiabatic module 303 is provided with an additional portion. For example, the side surface upper end coupling edge 410 provided on the outer cover 121 may be included.

The top surface vacuum adiabatic module 304 may move downward and inserted toward the left surface vacuum adiabatic module 303. Here, the rear surface vacuum adiabatic module 301 may be in a state of being coupled to the left surface vacuum adiabatic module 303. The upper end of the rear surface vacuum adiabatic module 301 may have a structure similar to the upper end of the left surface vacuum adiabatic module 303 of FIG. 21.

While the top surface vacuum adiabatic module 304 is being inserted into the left surface vacuum adiabatic module 303, the side surface upper end coupling edge 410 may be inserted into a gap between the outer coupling frame 403 and the upper end bending edge 412. Due to the insertion, correct seating of the top surface vacuum adiabatic module 304 and the left surface vacuum adiabatic module 302 may be set. After the seating, each of the frames 402 and 403 and the coupling edges 401, 404, and 412 may be coupled to each other. For the coupling, the method such as the welding and the adhesion may be applied.

The frame 402 and 403 may achieve the purpose of coupling between the portions, the purpose of increasing in strength of the body vacuum adiabatic module, and the purpose of increasing in overall strength of the main body.

Referring to FIG. 23, a cross-sectional structure of the main body provided by the top surface vacuum adiabatic module 304 and the left vacuum adiabatic module 302 may be seen. The foam portion 406 may be filled in a space of a contact portion between the top surface vacuum adiabatic module 304 and the left surface vacuum adiabatic module 302.

The foam portion 406 not only performs thermal insulation, but also reinforces the strength of the main body and allows the gap between each vacuum adiabatic module to be completely sealed. This action may be achieved by the body vacuum adiabatic module according to the embodiment.

In the modified example by the second adiabatic module replacing the foam portion, the description that is the same as described above will be omitted.

In the above description, the positions of the frames 402 and 403, the coupling edges 401 and 404, and the bending edges 405 and 412 may be provided to other portions that face each other and are coupled. Even if the portions are coupled to each other, there may be no limitation of the coupling operation.

An additional portion may be provided in the first adiabatic module. In another aspect, the additional portion may be understood as an additional component of the first adiabatic module.

The additional portion may further include coupling edges 124, 134, 144, 401, 404, 410, and 411 provided on the outer covers 201, 121, 131, and 141.

The coupling edges 124, 134, 144, 401, 404, 410, and 411 may extend from the outer covers 201, 121, 131, and 141.

The coupling edges 124, 134, 144, 401, 404, 410, and 411 may extend from a point at which the outer covers 201, 121, 131, and 141 and the conductive resistance sheets 60 and 123 are coupled to each other.

The coupling edges 124, 134, 144, 401, 404, 410, and 411 may be provided in substantially the same direction as the outer covers 201, 121, 131, and 141 facing the third space.

When there are a plurality of the first adiabatic modules, the coupling edges 124, 134, 144, 401, 404, 410, and 411 provided on any one of the plurality of first adiabatic modules may extend in a direction toward the other first adiabatic module of the plurality of first adiabatic modules.

Each of the coupling edges 124, 134, 144, 401, 404, 410, and 411 may include a first portion and a second portion.

The first portion of each of the coupling edges 124, 134, 144, 401, 404, 410, and 411 may be connected to each of the outer covers 201, 121, 131, and 141. The second portion of each of the coupling edges 124, 134, 144, 401, 404, 410, and 411 may be a portion extending in a direction away from the outer covers 201, 121, 131, and 141 from the first portion.

One end of the second portion of each of the coupling edges 124, 134, 144, 401, 404, 410, and 411 may be connected to the first portion. The other end of the second portion of each of the coupling edges 124, 134, 144, 401, 404, 410, and 411 may be spaced a predetermined distance from the other first adiabatic module.

The additional portion may further include an inner coupling frame 402 provided on the outer surfaces of the inner covers 101, 122, 132, and 142.

The inner coupling frame 402 may be provided on the inner side of the inner covers 101, 122, 132, and 142. The inner coupling frame 402 may be provided outside the inner covers 101, 122, 132, and 142.

The inner coupling frame 402 may cover the edges of the inner covers 101, 122, 132, and 142, or the inner coupling frame 402 may overlap the edges of the inner cover 101, 122, 132, and 142. Such the configuration may reduce deformation of the edges of the inner covers 101, 122, 132, and 142 by the external force.

The inner coupling frame 402 may be provided to cover an edge of the conductive resistance sheets 60 and 123 or so that the inner coupling frame 402 overlaps the conductive resistance sheets 60 and 123. Such the configuration may protect the conductive resistance sheet 60,123 provided in the form of a thin film from being damaged.

The inner coupling frame 402 may cover the portion at which the inner covers 101, 122, 132, and 142 and the conductive resistance sheets 60 and 123 are coupled, or the inner coupling frame 402 may overlap the inner covers 101, 122, 132, and 142 and the conductive resistance sheets 60, 123. Such the configuration may reduce that the coupled portions between the conductive resistance sheets 60 and 123 and the inner covers 101, 122, 132, and 122 are damaged or separated by the external force.

A second adiabatic module may be disposed outside the conductive resistance sheets 60 and 123. Each of the conductive resistance sheets 60 and 123 may have one surface facing the third space and the other surface facing the second adiabatic module. Such the configuration may reduce dew generated around the conductive resistance sheets 60 and 123 or reduce the damage of the conductive resistance sheets 60 and 123 by the external force. The conductive resistance sheets 60 and 123 may be disposed to contact the second adiabatic module.

The inner coupling frame 402 may be provided to overlap at least a portion of the first portion of the coupling edges 124, 134, 144, 401, 404, 410, and 411. The first adiabatic module is strong against the external force. The reason is that the vacuum space is defined inside the first adiabatic module, and a support is provided therein. On the other hand, the coupling edges 124, 134, 144, 401, 404, 410, and 411 extending from the first adiabatic module may be vulnerable to deformation to the external force. If the inner coupling frame 402 is provided to overlap at least a portion of the first portion of the coupling edges 124, 134, 144, 401, 404, 410, and 411, the deformation to the external force may be reduced.

The second adiabatic module may be disposed in a space defined between the inner coupling frame 402 and the coupling edges 124, 134, 144, 401,404, 410, and 411. As described above, when the second adiabatic module is disposed in the space defined between the inner coupling frame 402 and the coupling edges 124, 134, 144, 401, 404, 410, and 411, the deformation of the coupling edge 124, 134, 144, 401, 404, 410, and 411 to the external force may be further reduced.

When there are a plurality of the first adiabatic modules, the inner coupling frame 402 may be configured to connect one inner cover to the other inner cover of the plurality of first adiabatic modules.

When there are a plurality of the first adiabatic modules, one end of the inner coupling frame 402 may contact one inner cover of the plurality of first adiabatic modules, and the other end of the inner coupling frame 402 may connect other inner covers to each other.

When there are a plurality of the first adiabatic modules, the inner coupling frame 402 may extend from one of the plurality of first adiabatic modules toward the other one of the plurality of first adiabatic modules. At least a portion of the inner coupling frame 402 may be provided on the other outer surface of the plurality of first adiabatic modules.

The inner coupling frame 402 may include a first portion and a second portion. The inner coupling frame 402 may include a first portion and a second portion to surround an edge of a wall defining the first space. Such the configuration may solidify the wall defined by the first adiabatic module.

This is done because a corner of the wall defining the first space may be more vulnerable to the external force.

A portion of the first portion of the inner coupling frame 402 may contact the inner covers 101, 122, 132, and 142 of the first adiabatic module, and the other portion of the first portion of the inner coupling frame 402 may contact the second adiabatic module. Such the configuration may secure the coupling of the first and second adiabatic modules.

When there are a plurality of the first adiabatic modules, the first portion of the inner coupling frame 402 may be connected to any one of the plurality of first adiabatic modules. The second portion of the inner coupling frame 402 may be configured to be connected between the other inner cover of the plurality of first adiabatic modules.

When there are a plurality of the first adiabatic modules, the first portion of the inner coupling frame 402 may be configured to contact one of the plurality of first adiabatic modules. The second portion of the inner coupling frame 402 may be configured to contact the other inner cover of the plurality of first adiabatic modules.

The inner coupling frame 402 may be disposed outside the vacuum space so that the vacuum adiabatic modules are coupled to each other to serve to reinforce strength of the main body.

The first portion may be provided to cover the edges of the inner covers 101, 122, 132, and 142 of the first adiabatic module. The first portion may be provided to overlap the edges of the inner covers 101, 122, 132, and 142 of the first adiabatic module.

The first portion may be provided to cover the edges of the conductive resistance sheets 60 and 123 of the first adiabatic module. The first portion may be provided to overlap the conductive resistance sheets 60 and 123 of the first adiabatic module.

The first portion may be provided to cover a portion at which the inner covers 101, 122, 132, and 142 of the first adiabatic module and the conductive resistance sheets 60, 123 of the first adiabatic module are coupled to each other. The first portion may be provided to overlap the portion at which the inner covers 101, 122, 132, and 142 of the first adiabatic module and the conductive resistance sheets 60, 123 of the first adiabatic module are coupled to each other.

The first adiabatic module may be provided in plurality. The second portion of one of the plurality of first adiabatic modules may be provided to cover the edge of the other inner cover of the plurality of first adiabatic modules or the conductive resistance sheets 60 and 123. The second portion of one of the plurality of first adiabatic modules may be provided to overlap the edge of the other inner cover of the plurality of first adiabatic modules or the conductive resistance sheets 60 and 123.

The first adiabatic module may be provided in plurality. The second portion of one of the plurality of first adiabatic modules may be provided to cover a portion at which the other inner cover of the plurality of first adiabatic modules and the conductive resistance sheets 60 and 123 are coupled to each other. The second portion of one of the plurality of first adiabatic modules may be provided to overlap the portion at which the other inner cover of the plurality of first adiabatic modules and the conductive resistance sheets 60 and 123 are coupled to each other.

The first adiabatic module may further include an outer coupling frame 403 provided to be connected to the coupling edges 124, 134, 144, 401, 404, 410, and 411. The outer coupling frame 403 may be provided on the outer surface of the second portion of the coupling edges 124, 134, 144, 401, 404, 410, and 411.

The outer coupling frame 403 may include a first portion and a second portion. The outer coupling frame 403 may include a first portion and a second portion so as to surround an edge of a wall defining the second space. The outer coupling frame 403 may be disposed outside the vacuum space so that the vacuum adiabatic modules are coupled to each other to serve to reinforce strength of the main body. The outer coupling frame 403 may be disposed in an inner space defined by the coupling edges 124, 134, 144, 401, 404, 410, and 411 and the side surface rear end coupling edge 404 of the right surface vacuum adiabatic module 303.

The first portion may be provided to cover the edges of the coupling edges 124, 134, 144, 401, 404, 410, and 411 of the first adiabatic module. The first portion may be provided to overlap the edges of the coupling edges 124, 134, 144, 401, 404, 410, and 411 of the first adiabatic module.

The first adiabatic module may be provided in plurality. The first portion of one of the plurality of first adiabatic modules may be provided to be spaced apart from the other conductive resistance sheets 60 and 123 of the other one of the plurality of first adiabatic modules. The first portion of one of the plurality of first adiabatic modules may be provided to overlap the conductive resistance sheets 60 and 123.

A separate coupling portion may be provided to couple the first and second adiabatic modules.

The coupling portion may be coupled to the second adiabatic module by passing through at least a portion of the inner coupling frame 402. The coupling portion may be disposed so as not to contact the conductive resistance sheets 60 and 123. The coupling portion may be disposed to be spaced a predetermined distance from the conductive resistance sheets 60 and 123. The coupling portion may be disposed at a position closer to the second adiabatic module than to the third space. The coupling portion may be disposed at a position spaced a predetermined distance from the conductive resistance sheet in the direction of the second adiabatic module. Such the configuration may reduce the damage of the conductive resistance sheets 60 and 123 in the process of coupling the coupling portion. Also, when the coupling portion contacts the conductive resistance sheet 123, the first and second coupling portions provide another heat transfer path, and thus, dew may be increasingly generated around the conductive resistance sheet 123.

The coupling portion may be coupled to the second adiabatic module by passing through at least a portion of the inner coupling frame 402. The coupling portion may be coupled to the second adiabatic module by passing through at least a portion of the outer coupling frame 403.

The coupling portion may be provided in plurality.

The first coupling portion 441 may pass through the first portion 4021 of the inner coupling frame 402 and be coupled to the second adiabatic module.

The second coupling portion 442 may pass through the second portion 4022 of the inner coupling frame 402 and be coupled to the second adiabatic module. The first and second coupling portions may be disposed so as not to contact the conductive resistance sheets 60 and 123. The first and second coupling portions may be disposed to be spaced a predetermined distance from the conductive resistance sheet 60,123. The first and second coupling portions may be disposed closer to the second adiabatic module than to the third space. The first and second coupling portions may be disposed to be spaced a predetermined distance from the conductive resistance sheet in the direction of the second adiabatic module.

To increase in coupling force of the coupling portions 441 and 442, the plate of the adiabatic module may extend further outward from the conductive resistance sheet, and the coupling portion may be coupled to the extending portion. In another case, a separate connection portion may be further provided, and a coupling portion may be coupled to the connection portion.

The third coupling portion may be coupled to the second adiabatic module by passing through the coupling edges 124, 134, 144, 401, 404, 410, and 411 of the first adiabatic module.

FIGS. 19 and 20 to 23 illustrate an embodiment in which the first adiabatic module and the second adiabatic module illustrated in FIG. 10 are connected or coupled to each other.

FIGS. 19 and 20 to 23 illustrate an embodiment in which the plurality of first adiabatic modules illustrated in FIG. 10 are provided, and the plurality of first adiabatic modules are connected or coupled to each other through the second adiabatic module.

In this embodiment, FIGS. 19 and 20 to 23 may illustrates modified examples in which the forgoing embodiment and the embodiment of FIGS. 11 and 12 are combined with each other.

For example, in FIGS. 19 and 20 to 23, the first adiabatic module of FIG. 10 according to the forgoing embodiment is replaced with the first adiabatic module of FIG. 11.

For another example, in FIGS. 19 and 20 to 23, the first adiabatic module of FIG. 10 according to the forgoing embodiment is replaced with the first adiabatic module of FIG. 12.

The modified examples are the same as the description of the attached drawings except for the other portions of FIGS. 10 and 11 and the other portions of FIGS. 10 and 12, and thus, detailed descriptions thereof will be omitted.

INDUSTRIAL APPLICABILITY

The present invention proposes the vacuum adiabatic module that is capable of being applied as the module in the case of various adiabatic products provided in various sizes, structures, and shapes.

Since the modularization of the vacuum adiabatic body is enabled, it may be possible to drastically reduce the amount of stock of the adiabatic products, especially, components used in the refrigerator.

Due to such the proposed plan, it may be possible to expect the effect that further approaches the industrial use of the vacuum adiabatic body.

The invention claimed is:

1. A vacuum adiabatic module comprising:
    at least one first adiabatic module including:
        an inner cover configured to provide a side for an inner space;
        an outer cover configured to provide a side for an outer space; and
        a vacuum space defined by space between the outer cover and the inner cover, and the vacuum space to be in a vacuum state; and
    a second adiabatic module, and an adiabatic degree of the second adiabatic module being less than an adiabatic degree of the first adiabatic module,
    wherein the at least one first adiabatic module comprises first adiabatic modules,
    wherein the second adiabatic module is configured to contact a first one of the first adiabatic modules and to contact a second one of the first adiabatic modules such that the second adiabatic module to connect the first adiabatic modules, and
    wherein the vacuum adiabatic module further comprises an inner coupling frame to connect the inner cover of the first one of the first adiabatic modules to the inner cover of the second one of the first adiabatic modules.

2. The vacuum adiabatic module according to claim 1, wherein the outer cover comprises:
    an outer surface to provide the side for the outer space, and the outer surface to extend in a first direction;
    a side surface to extend in a second direction different from the first direction; and
    a middle portion between an end of the outer surface and an end of the side surface.

3. The vacuum adiabatic module according to claim 2, comprising a reinforcement frame provided in the vacuum space to contact the outer surface, the side surface, and the middle portion, and the reinforcement frame to reduce shape deformation of the vacuum adiabatic module.

4. The vacuum adiabatic module according to claim 1, comprising a conductive resistance sheet configured to resist thermal conduction, the conductive resistance sheet to provide a connection between the inner cover and the outer cover,
    wherein the conductive resistance sheet is to extend in the same direction as the inner cover.

5. The vacuum adiabatic module according to claim 1, comprising a reinforcement frame to couple to the inner cover.

6. The vacuum adiabatic module according to claim 1, wherein a thickness of the inner cover is less than a thickness of the outer cover.

7. The vacuum adiabatic module according to claim 1, wherein the outer cover being larger than the inner cover.

8. The vacuum adiabatic module according to claim 1, comprising a coupling frame to couple to at least one of the outer cover or the inner cover.

9. The vacuum adiabatic module according to claim 1, wherein the outer cover is to extend from the vacuum space to provide a coupling edge configured to couple to another component.

10. The vacuum adiabatic module according to claim 4, wherein the conductive resistance sheet is thinner than at least one of the inner cover or the outer cover.

11. The vacuum adiabatic module according to claim 1, wherein the inner coupling frame comprises a first portion and a second portion at an edge of a wall configured to define the inner space.

12. The vacuum adiabatic module according to claim 11, wherein the first portion of the inner coupling frame is disposed to overlap the inner cover of the first one of the first adiabatic modules.

13. The vacuum adiabatic module according to claim 11, wherein a first part of the first portion of the inner coupling frame is disposed to contact the inner cover of the first one of the first adiabatic modules, and
    a second part of the first portion of the inner coupling frame is disposed to contact the second adiabatic module.

14. The vacuum adiabatic module according to claim 10, comprising a coupling portion to couple the first one of the first adiabatic modules and the second adiabatic module, and
    the coupling portion is spaced a predetermined distance from the conductive resistance sheet.

15. The vacuum adiabatic module according to claim 10, wherein a first surface of the conductive resistance sheet faces the vacuum space and a second surface of the conductive resistance sheet faces the second adiabatic module.

16. The vacuum adiabatic module according to claim 10, comprising a rear surface coupling edge that extends from the outer cover of the first one of the first adiabatic modules toward the second one of the first adiabatic modules.

17. The vacuum adiabatic module according to claim 16, wherein the rear surface coupling edge extends from a point at which the outer cover and the conductive resistance sheet are coupled to each other.

18. The vacuum adiabatic module according to claim 16, wherein the second adiabatic module is disposed between the inner coupling frame and the rear surface coupling edge.

19. The vacuum adiabatic module according to claim 10, wherein the second adiabatic module includes a through-hole configured for passage of at least one of an electric line, a refrigerant pipe, a cool air passage, or a water flowing pipe.

* * * * *